US010226795B2

United States Patent
Schroader

(10) Patent No.: US 10,226,795 B2
(45) Date of Patent: Mar. 12, 2019

(54) VISION BASED ITEM TYPING AND SEPARATION SYSTEM

(71) Applicant: FIVES INTRALOGISTICS CORP., Louisville, KY (US)

(72) Inventor: Steven Vann Schroader, Louisville, KY (US)

(73) Assignee: Fives Intralogistics Corp., Louisville, KY (US)

( * ) Notice: Subject to any disclaimer, the term of this patent is extended or adjusted under 35 U.S.C. 154(b) by 0 days.

(21) Appl. No.: 15/588,230

(22) Filed: May 5, 2017

(65) Prior Publication Data

US 2017/0312789 A1    Nov. 2, 2017

Related U.S. Application Data

(63) Continuation-in-part of application No. 14/998,405, filed on Dec. 31, 2015, now Pat. No. 9,771,222, and a continuation-in-part of application No. 14/998,406, filed on Dec. 31, 2015.

(60) Provisional application No. 62/391,653, filed on May 5, 2016.

(51) Int. Cl.
| | |
|---|---|
| *B65G 47/26* | (2006.01) |
| *B07C 5/10* | (2006.01) |
| *B07C 5/36* | (2006.01) |
| *B07C 5/34* | (2006.01) |
| *B65G 43/08* | (2006.01) |
| *B65G 47/54* | (2006.01) |
| *B65G 43/10* | (2006.01) |
| *B65G 47/68* | (2006.01) |
| *B65G 47/31* | (2006.01) |

(52) U.S. Cl.
CPC ............. *B07C 5/10* (2013.01); *B07C 5/3412* (2013.01); *B07C 5/362* (2013.01); *B65G 43/08* (2013.01); *B65G 43/10* (2013.01); *B65G 47/54* (2013.01); *B65G 47/681* (2013.01); *B65G 47/31* (2013.01); *B65G 2201/0285* (2013.01); *B65G 2203/041* (2013.01); *B65G 2811/0673* (2013.01)

(58) Field of Classification Search
USPC .......... 198/443, 444, 448; 700/228, 229, 230
See application file for complete search history.

(56) References Cited

U.S. PATENT DOCUMENTS

| | | | |
|---|---|---|---|
| 5,141,097 | A | 8/1992 | Oiry et al. |
| 5,165,520 | A | 11/1992 | Nerve et al. |
| 5,871,078 | A | 2/1999 | Arnarson et al. |
| 6,401,936 | B1 | 6/2002 | Isaacs et al. |
| 6,471,044 | B1 | 10/2002 | Isaacs et al. |
| 6,629,018 | B2 | 9/2003 | Mondie et al. |
| 6,729,463 | B2 | 5/2004 | Pfeiffer |
| 6,751,524 | B2 | 6/2004 | Neary et al. |
| 7,191,895 | B2 | 3/2007 | Zeitler et al. |
| 7,413,071 | B2 | 8/2008 | Zeitler et al. |

(Continued)

*Primary Examiner* — Gene O Crawford
*Assistant Examiner* — Lester III Rushin
(74) *Attorney, Agent, or Firm* — Carrithers Law Office, PLLC

(57) ABSTRACT

A typing tunnel off-loading and sorting system includes an off-loading conveyor, cameras and photoelectric eye. The overhead cameras detect the item size and whether it is cubic in nature and type and size of its footprint. An in-line slide sorter having alternating conveyor rollers and pop-up belts pass through to, or divert articles from, a downstream conveyor. The vision based system may also be used to detect space between articles and insert articles in the unoccupied space.

10 Claims, 17 Drawing Sheets

(56) References Cited

U.S. PATENT DOCUMENTS

| | | |
|---|---|---|
| 7,591,365 B2 | 9/2009 | Knepple et al. |
| 7,631,747 B2 | 12/2009 | Zeitler |
| 8,061,506 B2 | 11/2011 | Schafer |
| 8,201,681 B2 | 6/2012 | Schiesser et al. |
| 8,360,230 B2 | 1/2013 | Rompe |
| 8,408,380 B2 | 4/2013 | Doane |
| 2001/0030102 A1 | 10/2001 | Woltjer et al. |
| 2001/0035332 A1 | 11/2001 | Zeitler |
| 2003/0141165 A1 | 7/2003 | Reznik et al. |
| 2007/0246328 A1 | 10/2007 | Reznik |
| 2009/0114575 A1 | 5/2009 | Carpenter et al. |
| 2009/0145967 A1 | 6/2009 | Carpenter |
| 2009/0250311 A1 | 10/2009 | Honegger |
| 2010/0012464 A1 | 1/2010 | Schiesser et al. |
| 2010/0155194 A1 | 6/2010 | Schafer |
| 2011/0056798 A1 | 3/2011 | Vok et al. |
| 2011/0214964 A1 | 9/2011 | Zimmermann |
| 2011/0240439 A1 | 10/2011 | Rompe |
| 2013/0056329 A1 | 3/2013 | Grootherder et al. |
| 2014/0121826 A1 | 5/2014 | Kreitmeier et al. |
| 2014/0364998 A1 | 12/2014 | Neiser et al. |

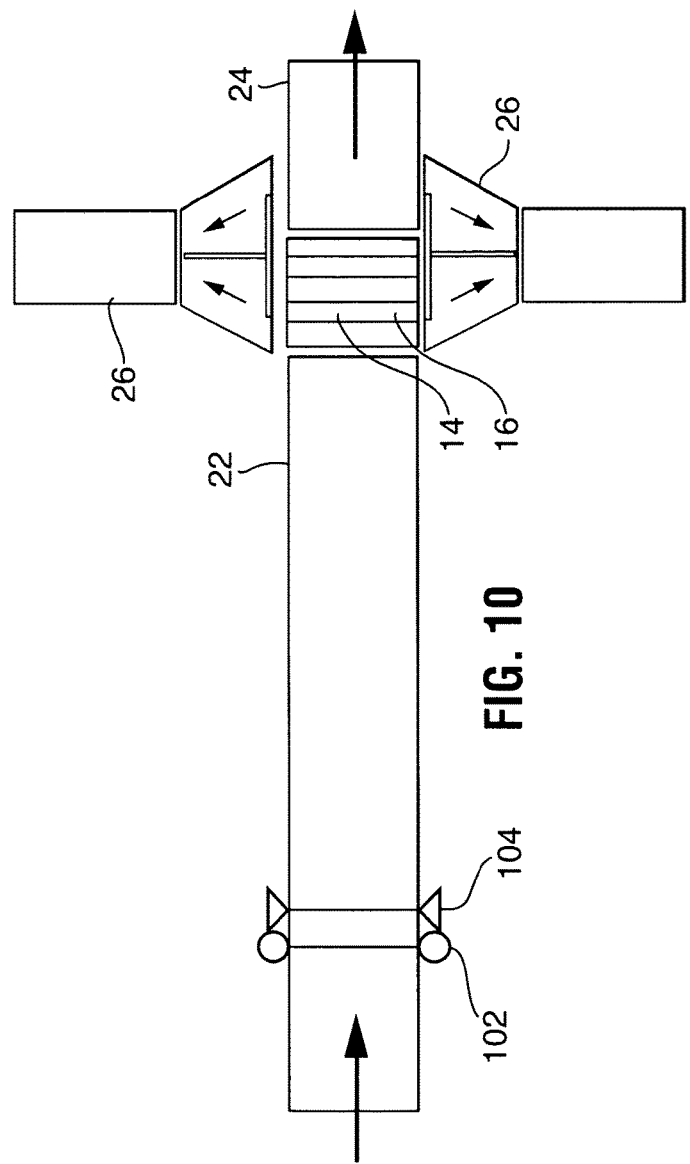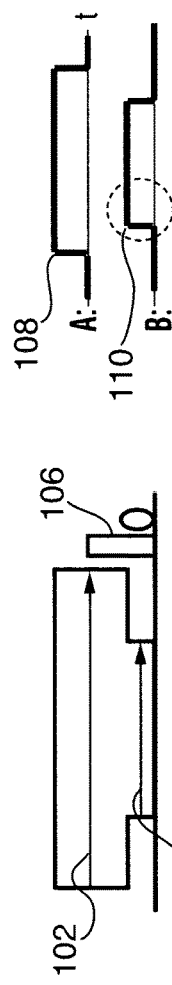

US 10,226,795 B2

VISION BASED ITEM TYPING AND SEPARATION SYSTEM

CROSS REFERENCES TO RELATED APPLICATIONS

This application is a continuation in part of U.S. application Ser. No. 14/998,405 filed on Dec. 31, 2015 and U. S. application Ser. No. 14/998,406 filed on Dec. 31, 2015 and claims priority from U.S. Provisional Application Ser. No. 62/391,653 filed on May 5, 2016 all of which are incorporated by reference herein in their entirety.

TECHNICAL FIELD OF THE INVENTION

The present invention relates to material handling and in particular to methods and apparatuses for conveying packages and a mechanism for sensing the location and physical characteristics of packages on a transport such as rail car, airplane, ship, or truck in order to send the article to the appropriate sorting system and controlling the transfer speed of the articles.

BACKGROUND OF THE INVENTION

Automated transfer systems are utilized by parcel delivery companies and airports to match in-coming packages with proper outgoing transport headed for the packages' destinations. For instance in the courier industry, shippers load truck trailers with mixed loads including envelopes, parcels, packages, bags, or individual articles of different size, weight, and physical characteristics including height, width, and length and irregular dimensions. The items are off-sorted into "small" "regular" and "irregular/incompatible" groupings. Conventional methods of automating unloading equipment have met limited success of automatic. Robotic "gripper" technology is expensive. The sorting equipment must be very fast, yet provide gentle and accurate handling of packages of various dimensions, shapes, and sizes. Different sorting sub-systems must be used to process different types of items. Manual labor is still used to sort unconventional shaped packages.

A reliable need still exists for separating items from the shipping container, i.e. trailer according to the type of parcel. Meeting this goal is particularly difficult in the case of large or heavy irregular shaped packages. Belt and roller conveyor systems have often been used in package sorting systems to move packages from in-coming loading docks to outgoing transport. An initial sorting of packages traveling along a conveyor may be accomplished by diverting packages from the conveyor based on their destinations, or based on their size, weight or other characteristics.

Some conveyor systems include a main conveyor having a belt or multiple powered rollers or wheels fitted between the wheels below the normal conveyor surface. U.S. Pat. No. 3,926,298 teaches a conveyor assembly wherein a section of the drive rollers can be lowered to drop a parcel onto the belt conveyor, without interrupting the speed of articles moving along the primary path. However, the belt conveyor can divert in only one direction.

U.S. Pat. No. 5,547,084 teaches a luggage sorting system in which bags are fed onto a moving carriage that includes multiple conveyors. After loading, the carriage moves along a track until it aligns with output conveyors. Then the carriage conveyors shift the bags from the carriage to appropriate output conveyors. This is not a high speed sorting system because the bags must come to rest on the carriage and be transported laterally, and then accelerated again after sorting.

U.S. Pat. No. 5,699,161 teaches a method and apparatus for measuring the dimensions of a package utilizing triangulation range finder lasers.

U.S. Pat. Nos. 6,690,995 and 6,952,626 teach a center of gravity and dimension measuring device and apparatus.

Conventional pop-up transfer conveyors require that the on-coming conveyor belt stop as the article passes over the pop-up transfer conveyor in order that the belts of the pop of conveyor can be raised and activated to transfer the article onto a receiving or diverging conveyor with the article maintained in a proper orientation for conveyance on the receiving conveyor. A problem occurs when the oncoming conveyor does not stop with the article over the pop-up conveyor, in that longitudinal articles are rotated sideways in the transfer procedure which causes downstream orientation problems with the receiving conveyor.

Under both manual and automatic scenarios to transport or container unloading, it is convenient to use a single extendable belt conveyor to transfer items from within the trailer or storage facility. Different sorting sub-systems process different types items. There is a need for a process to automatically separate different parcel types as they are unloaded from the trailer or transport and for a diverter that can reliably divert irregular shaped packages from a main conveyor path, using a slide sorter mechanism that is modular and easy to repair, all while operating at a high speed of throughput along the main path.

SUMMARY OF THE INVENTION

Positioned subsequent to the typing tunnel off-loading collection conveyor is a slide sorter module having a slide sorter central conveyor positioned to divert small items to a first side conveyor positioned at a selected angle to and in flow communication with the central conveyor to convey articles toward a receiving conveyor; and optionally to divert a different size or shaped item to a second side conveyor positioned at a selected angle to and in flow communication with the central conveyor to convey articles toward an opposing receiving conveyor on a second side of the slide sorter module. Irregulars are passed straight through to a downstream receiving conveyor positioned in flow communication therewith.

The vision based control system and slide sorter conveyor system are described in U.S. application Ser. No. 14/998,406 filed on Dec. 31, 2015, (U.S. Publication No. 20160221766) for a "Vision Based Conveyor Package Flow Management System" and U.S. application Ser. No. 14/998,405 filed on Dec. 31, 2015, (U.S. Publication No. 20160221762) for a "Slide Sorter Pop-Up Diverting Conveyor With Transfer Rate Based on Article Characteristics" both of which are incorporated by reference herein in their entirety.

The vision based item typing and separation system employs a vision based system including a typing tunnel including an off-loading conveyor and at least one and preferably two overhead cameras and a low positioned single beam photoelectric eye. The two cameras are positioned overhead at each side of a conveyor, and the low positioned single beam photoelectric eye, (PE), is disposed near the camera location in the direction of flow. The overhead cameras detect the item size and whether it is cubic in nature and has a foot print comprising a flat bottom. Optionally a scale can be utilized in combination with the cameras and PE to determine the destination of the article by weight. Positioned subsequent to the typing tunnel off-loading collection conveyor is a slide sorter module having a slide sorter central conveyor positioned to divert small items to a first side conveyor positioned at a selected angle to and in flow communication with the central conveyor to convey articles toward a receiving conveyor; and optionally to divert a different size or shaped item to a second side conveyor positioned at a selected angle to and in flow communication with the central conveyor to convey articles toward an opposing receiving conveyor on a second side of the slide sorter module. Irregulars are passed straight through to a downstream receiving conveyor positioned in flow communication therewith.

The vision based item typing and separation system employs a vision based system comprises or consist of a typing tunnel including an off-loading conveyor and at least one and preferably two overhead cameras and a low positioned single beam photoelectric eye. The two cameras are positioned overhead at each side of a conveyor, and the low positioned single beam photoelectric eye, (PE), is disposed near the camera location in the direction of flow. The overhead cameras detect the item size and whether it is flat or cubic in nature and has a foot print comprising a flat bottom or an irregular bottom. Optionally a scale can be utilized in combination with the cameras and PE to determine the destination of the article by weight.

A camera based vision system recognizes and maximizes belt area utilization of the off-loading conveyor. A plurality of cameras are positioned at flow entry points of the off-loading feeding conveyor and the receiving conveyors. A computer with a control algorithm recognizes individual items area, foot print of the items and the rate at which individual objects are passing, and the area utilization of the off-loading belt. The video camera and computer based conveyor package management system monitor and control the speed of the off-loading conveyor based on the number and size of the packages present on the off-loading conveyor and slide sorter. Information from the receiving conveyor, collector conveyor, singulator conveyor and sorting conveyor in a package handling system may also be utilized wherein the camera data is used to measure the available area or space on the conveyors to maintain a desired density of packages on selected conveyor(s). The conveyor speed is controlled as a function of occupancy on a collector or just prior to a slide sorter conveyor, singulator, or receiver conveyor.

A camera is positioned at each individual input point, with a control algorithm to recognize incoming flow density, in terms of both belt utilization and throughput rate. These measures can be used to make changes to reduce parcel input flow, and could require stoppage of the feed line, if flow is too dense. Similarly, absence of flow could be recognized prompting an increase in speed of the input conveyor.

Cameras positioned to view the singulator surface are used in a similar matter to assess the buffer capacity utilization, primarily based on area coverage recognition. This feedback is used to dynamically adapt behavior of infeed lines. The use of web cams provides added benefits in terms of system control room visibility. Variations in parameters used to tune the system can be evaluated in a more efficient manner. Jams and other system problems are better recognized.

A video camera and computer based conveyor package management system includes video cameras monitoring the number and size of the packages present on the infeed conveyors, collector conveyor, singulator conveyor and sorting conveyor in a package handling system wherein the camera data is used to measure the available area or space on the conveyors to maintain a desired density of packages on selected conveyor(s). The conveyor speed is controlled as a function of occupancy on a collector or just prior to a singulator. The computer feeds the information to the conveyor speed controllers to introduce packages from one or more feed conveyors to a collection conveyor wherein packages are detected by one or more cameras and the speed of selected conveyors is controlled for arrangement of the packages at optimal spacing maximizing the density of the packages on a conveyor and throughput of the system and accordingly minimizing the number of conveyors required for the system. When the computer determines there is a enough space on one of the conveyor belts, for example, the collector belt, the computer tells the controller to add a package or packages by causing an infeed belt to add a package or packages to the space or vacant area on the collector belt.

In accordance with the present invention, there is provided a video/camera based conveyor package management system comprising, consisting of, or consisting essentially of a video compute and camera or other pixel detecting devices, a collector conveyor including separate sections of conveyor separately driven by individual motors with individual speed controllers, selected ones of the sections of the collector conveyor having means such as skewed rollers capable of urging a package to a selected side of the collector conveyor, a plurality of infeed conveyors including separate sections of conveyor separately driven by individual motors with individual speed controllers, first video cameras monitoring areas of the collector conveyor leading up to merge areas of each of the infeed conveyors with the collector conveyor, second video cameras monitoring areas of the infeed conveyor leading up to merge areas of each of the infeed conveyors with the collector conveyor, and a control program within the video computer capable of controlling speeds of the sections of the collector conveyor and of the sections of the infeed conveyors based on a calculated amount of free space on a given collector section compared to a footprint of a package on an oncoming infeed conveyor, as calculated on a pixel by pixel basis. A singulator conveyor may be incorporated within the conveyor system and fed by the collector conveyor.

The present invention also utilizes slide sorters utilize a pop-up conveyor or transfer mechanism to lift and carry selected articles, parcels, packages, bags to another conveyor oriented in a different direction and are often used in pallet handling, mail tray handling, or the like at rates of to 1500 items per hour which is more than the rate at which a trailer is typically unloaded. The pop-up conveyor is only activated upon its control system sensing by weight, footprint, flatness of foot print bottom, surface area of the foot print or selected points to determine length, width, or height, digital camera pixels, photo cell, infrared, laser, or other electronic or radiation detecting device an article moving toward it from a feed conveyor. The pop-up conveyor than raises above the surface level of the on-coming conveyor as the article passes thereover, to lift the article or portion thereof and support same on a conveyor means to transfer the article to a different conveyor or other article removing device. The pop-up conveyor typically remains inactive until the sensors sense an article on the feed conveyor in on or in close proximity to the pop-up conveyor whereby the conveyor is activated raising and engaging a belt, roller, chain drive or combinations thereof to contact the bottom surface of the article and push it at a selected angle, usually 90 degrees off of the on-coming feed conveyor.

The instant invention includes a plurality of sensors set to detect and activate the pop-up conveyor for articles of a selected size, weight, density, or other physical characteristic to separate and orient the articles for further separation. Moreover, the sensors can be set to allow articles having selected characteristics such as an envelope, or square box or package to proceed through and over the pop-up conveyor to the out-going through conveyor.

The slide sorter conveyor speed control system, comprises a first on-coming flow through conveyor positioned to carry articles in the direction of a longitudinal axis of said conveyor. A slide sorter pop-up conveyor is positioned normal to or across the longitudinal axis transverse to and slightly below the surface of the conveyor. It includes a transport mechanism being operative to move the pop-up conveyor between a home position in which the out-going flow through conveyor receives articles from the on-coming pass through conveyor and transfers them along the direction of said longitudinal axis. A diverting conveyor or receiving conveyor is position on either side or both sides of the flow through conveyors and receives items transferred by the pop-up conveyor moving them away from the direction of the longitudinal axis. A multiplexed light screen is used to detect the full length of items. A photocell or photo eye affixed over the on-coming conveyor surface detects portions of the irregular item that can be engaged by the pop-up conveyor. Computer control means or the PLC is provided for controlling actuation of said pop-up conveyor in response to data transmitted from the multiplexed light screen and the photo cells an and array of height sensors which slow the on-coming conveyor down just prior to tall articles contacting the op-up conveyor to prevent tip-over of top heavy items.

The vision based item typing and separation system employs a vision based system combined with a sorting system.

The vision based bulk package conveyor flow management system, comprises or consists of a feed conveyor and a receiving conveyor each one having independent drive means. A transition zone is selected between the feed conveyor and the receiving conveyor. At least one camera provides a selected field of view of the selected transition zone, a selected occupancy zone, or the selected transition zone and the selected occupancy zone. The unloading or feed conveyor, the receiver conveyor, or both convey at a selected speed or time to achieve a desired conveyor area utilization on a down stream receiving conveyor according to the formula V2=V1×2x(DO %)/(RCO %+FCO %) where V is volume, DO is Desired Occupancy, RCO is Receiving Conveyor Occupancy, and FCO is Feeding Conveyor Occupancy. The feed conveyor having a selected occupancy defined zone. The receiving conveyor having a selected occupancy defined zone. The transition section between the feed conveyor and the receiving conveyor are adapted for merging a plurality of packages from one to the other. The selected transition section includes a percentage of the desired occupancy of the receiving conveyor after the merger of the packages from the feed conveyor to the receiving conveyor. The sensors provide input to a programmable logic control device, "PLC" which is a digital computer used for automation of industrial electro-mechanical processes The PLC provides a "hard" real-time system since output results must be produced in response to input conditions within a limited time, otherwise unintended operation will result. A computer calculates a desired occupancy zone at a selected position, the conveyor speed and movement based upon signals received from the cameras identifying gaps between the packages on the receiving conveyor of sufficient space for insertion of an additional package from the feeding conveyor.

The slide sorter conveyor speed control system includes a first upstream conveyor conveying a first group of articles of a selected size, shape, irregular base, marking, or other characteristic and a second group of articles of a selected different size, shape of characteristic along a longitudinal axis of the first upstream conveyor. A second downstream conveyor conveying the first group of articles along a longitudinal axis of the second downstream conveyor. A pop-up or slide sorter conveyor is disposed between and in flow communication with the first upstream conveyor which passes through the first group of articles. The pop-up conveyor diverts and conveys the second group of articles in a direction away from the second downstream conveyor. The pop-up conveyor includes a frame including a plurality of spaced apart parallel conveyor rollers disposed normal to and at about the same height as the first upstream conveyor and the second downstream conveyor for receiving and conveying and passing through the first group of articles from the first upstream conveyor to the second downstream conveyor. A motor and drive means for rotates the conveyor rollers. At least one pop-up belt disposed between the spaced apart conveyor rollers, the pop-up belt is spaced apart from and in parallel alignment with the conveyor rollers which include a motor and drive means for rotating the one pop-up belt. The pop-up belt rests a selected distance below the conveyor rollers in an inactive position during conveying the first group of articles from the first upstream conveyor passing over and through the conveyor rollers of the pop-up conveyor to the second downstream conveyor. The pop-up conveyor includes cam means for raising the pop-up belt a selected distance above the conveyor rollers conveying and diverting the second group of articles from the second downstream conveyor. At least one multiplex light screen sensor detecting a full length of the first group of articles and the second group of articles. At least one photocell includes a transmitter projecting at least a single beam a selected distance over a surface of the first upstream conveyor. A receiver for receiving the at least a single beam detects portions of articles of the first group of articles resting on a surface of the first upstream conveyor surface and detects portions of articles of the second group of articles resting on a surface of the first upstream conveyor surface engageable by the at least one pop-up belt. Variable speed control means is used for controlling a conveying speed of the first upstream conveyor. Computer control means is in electrical communication with the variable speed control means and the pop-up conveyor motor and the first upstream conveyor for controlling actuation of the at least one pop-up belt of the pop-up conveyor in response to data transmitted from the multiplex light screen sensor and the photocell allowing the first group of articles to pass over the conveyor rollers and through the pop-up conveyor to the second downstream conveyor. The computer activates the cam means raising the at least one pop-up belt diverting the second group of articles away from the second downstream conveyor without stopping the first upstream conveyor and the second downstream conveyor. The computer receives input from the multiplex light screen sensor and controls the optimal speed of the first up-stream conveyor based upon the full length of the article and the portions of the article resting on the surface of the first up-stream conveyor slowing the first up-stream conveyor and activating the pop-up conveyor raising the belt to engage the portion of the article to be diverted. The computer controls the duration the pop-up belt remains activated based on the full length of the article to be diverted. The computer controls the speed of the first upstream conveyor and slows the speed of the first upstream conveyor prior to the article engaging the pop-up conveyor which is determined as a function of the length of the item or the length of a first portion of the article falling within a selected proximity to the pop-up conveyor.

One method of off-loading, typing, and sorting articles from a bulk package conveyor flow with a vision management system and pop-up slide sorter comprises the steps of identifying and sorting selected packages from an off-loading feed conveyor using a slide sorter pop-up conveyor includes the steps of conveying a selected group of articles of a selected size, shape, irregular base, ID marking, or other characteristic along a longitudinal axis of a first upstream off-loading feed conveyor, by a at least one photo eye device and/or at least one multiplex light screen sensor device identifying and sorting articles to be passed through to a downstream conveyor or diverted from the downstream conveyor. A positioning a pop-up or slide sorter conveyor between and in flow communication with the first upstream conveyor for passes selected articles over a plurality of rollers and through the pop-up conveyor to a second downstream conveyor. Selected articles are passed through or diverted using a pop-up conveyor having a plurality in line rollers and driven belts which are raised above the surface of the rollers to contact the surface and divert selected articles. A transition zone can be selected between a feed conveyor and a receiving conveyor each one having independent drive means. A camera field of view of the selected transition zone is determined for setting a speed or movement of the feed conveyor, the receiving conveyor, or both the feed conveyor and the receiving conveyor to achieve a desired conveyor area utilization on a down stream receiving conveyor according to the formula V2=V1×2x(DO %)/(RCO %+FCO %) where V is volume, DO is Desired Occupancy, RCO is Receiving Conveyor Occupancy, and FCO is Feeding Conveyor Occupancy. A percentage of the feed conveyor occupancy defined zone is determined, a percentage of the receiving conveyor occupancy defined zone is determined, and a percentage of a desired occupancy of the receiving conveyor is selected for merging packages from the feeding conveyor to the receiving conveyor. A conveyor area is selected including a desired occupancy zone at a selected position. The packages from the feed conveyor are fed to the receiving conveyor occupancy defined zone at a selected rate. The packages are conveyed toward the desired occupancy zone of the conveyor area at a selected position. The packages at the conveyor area of the transition section are merged between the feed conveyor and the receiving conveyor.

It is an object of the present invention to provide a conveyor pop-up slide sorter mechanism and speed sensing control system wherein items can be diverted without stopping the conveyor and bringing the item to rest prior to diverting the item with the pop-up slide sorter and the items are not brought to rest over the pop-up prior to it rising.

It is object of the present invention to control the speed of the conveyor decreasing the conveyor speed prior to the pop-up transfer as a function of the length of the item or the length of the first portion falling within close proximity to the conveying surface close enough that the pop-up belts can be expected to engage and impart a transverse force to discharge the item.

It is an object of the present invention to provide a typing tunnel with an off-loading collector conveyor for removal of items from a transport such as a trailer and to utilize cameras and a computer system to determine the size, type, dimensions, and irregularity of items to sort the items for processing.

It is object of the present invention to provide sensors to detect areas of the item resting on the conveyor to effect cooperative engagement with the pop-up conveyor.

It is an object of the present invention to provide a slide sorter speed control system having variable and/or multiple speed capabilities.

It is an object of the present invention to provide a slide sorter speed control system having at least three speeds including a feed belt slowing to either 100 or 200 from 300 feet per minute or to remain at 300 feet per minute prior to making a divert action.

It is an object of the present invention to provide a different raising point "encoder pulse" for each speed and a slow down point "encoder pulse" from and induct eye.

It is an object of the present invention to incorporate a computer control system to measure and apply the fastest speed that a variety of items can be handled such as a bumper, chain saw, table, tire, bucket, and 2×4 board of varying lengths to collect a range of flat bottom speed criteria.

It is an object of the present invention to a use a photo eye just above the belt surface to detect anything within about ⅜ inch above the belt.

It is an object of the present invention to provide a maximum safe speed calculated by the item length measured with the photo eye if flat or a first contact "pd" length measured with the photo eye.

It is an object of the present invention wherein speed length is measured with the photo eye.

It is an object of the present invention to determine a hit point or raise and a slowdown point from a lookup table.

It is another object of the present invention for the on-coming conveyor, the out-going conveyor, the pop-up slide sorter conveyor, take-off roll, and receiver or diverter conveyor to have variable rates of speed.

It is an object of the present invention to develop a pop-up timed to raise when the front of an item crosses the first lift rail.

It is another object of the present invention to provide at least a three speed adjustment wherein the hit point is 131 at 300 feet per minute and slow down is 120, the hit point is 134 at 200 feet per minute and a slow down is 125, and a hit point of 139 at 100 feet per minute and a slow down of 126.

It is an object of the present invention to provide a pop-up belt having a speed of at least two meters/second (394 fpm), activated upon raising.

It is an object of the present invention wherein the lift mechanism stays up based on item lift length measured with the second photo eye, plus a length adder using a feed belt encoder (length added approx 30 inches).

It is an object of the present invention to provide acceleration and deceleration rates on slowdown and speed of about 0.3 G's.

It is an object of the present invention to provide a selected minimum gap.

It is an object of the present invention to include an array of height sensors to detect tall top heavy items to control conveyor to obtain a maximum safe speed to prevent tip over during the slide sorter transfer.

The vision based typing and separation system provides a method of managing bulk package conveyor flow with a vision management system, comprising or consisting of the steps of selecting a transition zone between an off-loading feed conveyor and a receiving conveyor each one having independent drive means. Selecting a camera field of view of the selected transition zone. Setting a speed or movement of the feed conveyor, the receiving conveyor, or both the feed conveyor and the receiving conveyor to achieve a desired conveyor area utilization on a down stream receiving conveyor according to the formula V2=V1×2x(DO %)/(RCO %+FCO %) where V is volume, DO is Desired Occupancy, RCO is Receiving Conveyor Occupancy, and FCO is Feeding Conveyor Occupancy. Determining a percentage of the feed conveyor occupancy defined zone. Determining a percentage of the receiving conveyor occupancy defined zone. Selecting a percentage of a desired occupancy of the receiving conveyor after a merger of the packages from the feeding conveyor to the receiving conveyor. Selecting a conveyor area including a desired occupancy zone at a selected position. Feeding the packages from the feed conveyor to the receiving conveyor occupancy defined zone at a selected rate. Conveying the packages toward the desired occupancy zone of the conveyor area at a selected position. Merging the packages at the conveyor area of the transition section between the feed conveyor and the receiving conveyor.

A method of diverting selected packages from an off-loading feed conveyor using a slide sorter pop-up conveyor includes the steps of conveying a selected group of articles of a selected size, shape, irregular base, ID marking, or other characteristic along a longitudinal axis of a first upstream off-loading feed conveyor. A pop-up or slide sorter conveyor is disposed between and in flow communication with the first upstream conveyor for passing selected articles over a plurality of rollers and through the pop-up conveyor to a second downstream conveyor. Selected articles to be diverted are conveyed by a slide sorter pop-up conveyor in a direction away from the second downstream conveyor by a plurality of driven belts of a pop-up conveyor which are raised above the surface of the rollers to contact the surface of the conveyed article. The pop-up belt is spaced apart from and in parallel alignment with the conveyor rollers which include a motor and drive means for rotating the one pop-up belt. The pop-up belt rests a selected distance below the conveyor rollers in an inactive position during conveying the first group of articles from the first upstream conveyor passing over and through the conveyor rollers of the pop-up conveyor to the second downstream conveyor. Raising the pop-up belt a selected distance above the conveyor rollers by a cam means conveys and diverts the second group of articles away from the second downstream conveyor.

Photo eyes and multiplex light screen sensors can be used together with or instead of cameras in particular applications to identified articles to be sorted and conveyed to particular locations. Detecting a full length of a selected article of the first group of articles and the second group of articles can be accomplished using at least one multiplex light screen sensor. Using at least one photocell with a transmitter projecting at least a single beam a selected distance over a surface of a conveyor to a receiver detects portions of articles resting on a surface of the first upstream conveyor surface engageable by the pop-up belt. Using variable speed control device controls conveying speed of the first upstream conveyor. Computer control means in electrical communication with the variable speed control means and the pop-up conveyor motor and the first upstream conveyor motor controls actuation of the pop-up belt of the pop-up conveyor in response to data transmitted from the multiplex light screen sensor and the photocell allowing the first group of articles to pass over the conveyor rollers and through the pop-up conveyor to the second downstream conveyor. Raising the pop-up belt diverts selected articles away from the second downstream conveyor without stopping the first upstream conveyor. The computer receives input from the multiplex light screen sensor, cameras, or both and controls the optimal speed of the first up-stream conveyor based upon the full length of the article and the portions of the article resting on the surface of the first up-stream conveyor slowing the first up-stream conveyor and activating the pop-up conveyor raising the belt to engage the portion of the article to be diverted. The computer controls the duration the pop-up belt remains activated based on the full length of the article to be diverted. The computer controls the speed of the first upstream conveyor and can slow the speed of the first upstream conveyor prior to the article engaging the pop-up conveyor. The speed of the feed conveyor, pop up conveyor and residence time of the article on the pop-up conveyor is determined as a function of the length of the item or the length of a first portion of the article falling within a selected proximity to the pop-up conveyor.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 10 shows a flow through conveyor having a slide sorter with a pop-up belt in flow communication with a pair of opposing 90 degree take away output lanes, and sensor inputs including a multiplexed light screen sensor to detect the length of items and photocell (single beam) sensor to detect portions of the item that can be engaged by the pop-up belt;

FIG. 11 is an example of a sensor input for an item with an irregular base showing the height of the light sensor and photocell;

FIG. 12 is an example of a sensor input for a foot print of an item with an irregular base;

DETAILED DESCRIPTION OF THE PREFERRED EMBODIMENT

Figure 1:
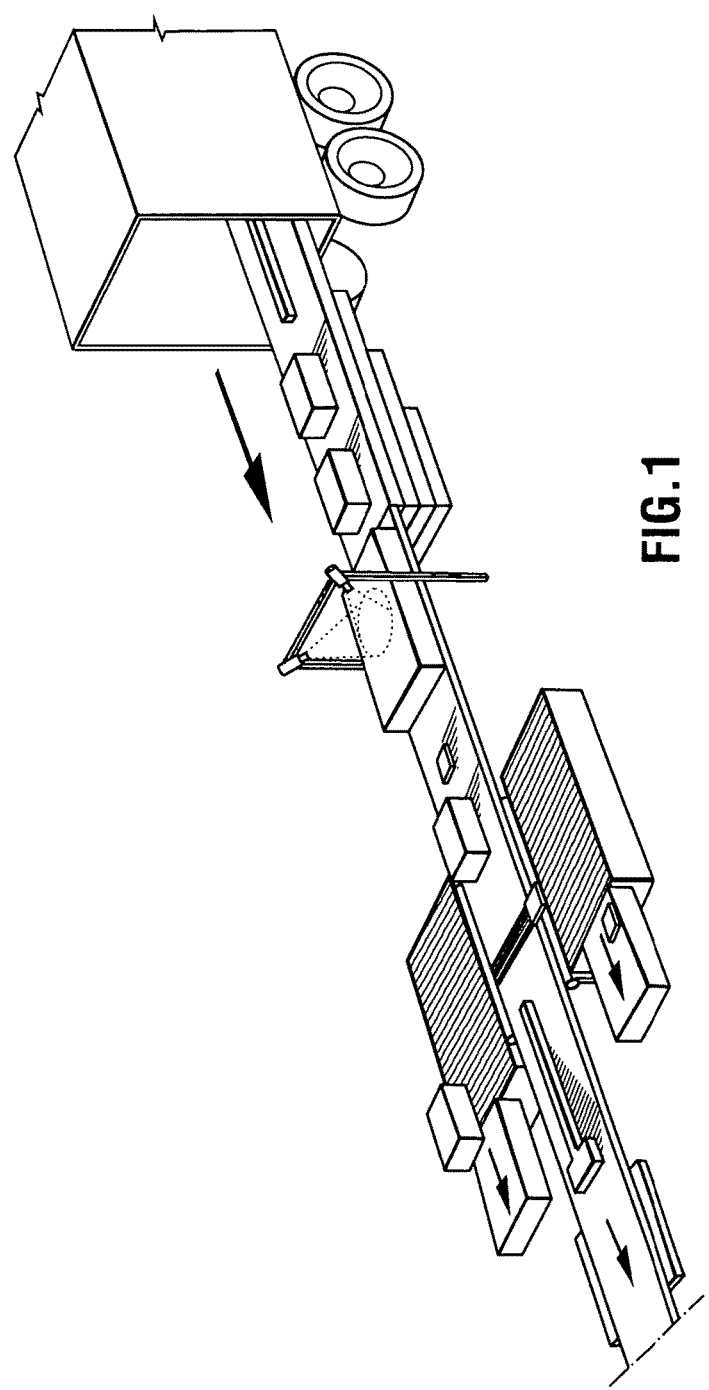
FIG. 1 is a perspective view of the vision based item typing and separation apparatus showing the truck, an extendable off-loading collector feed conveyor extending from the floor of the trailer, a stand supporting a pair of cameras, a photoelectric eye above the off loading conveyor in occupancy defined zone, the percentage of the receiving conveyor occupancy defined zone, and the percentage flow communication with a slide sorter conveyor in flow communication with side conveyors and a downstream conveyor.
Figure 2:
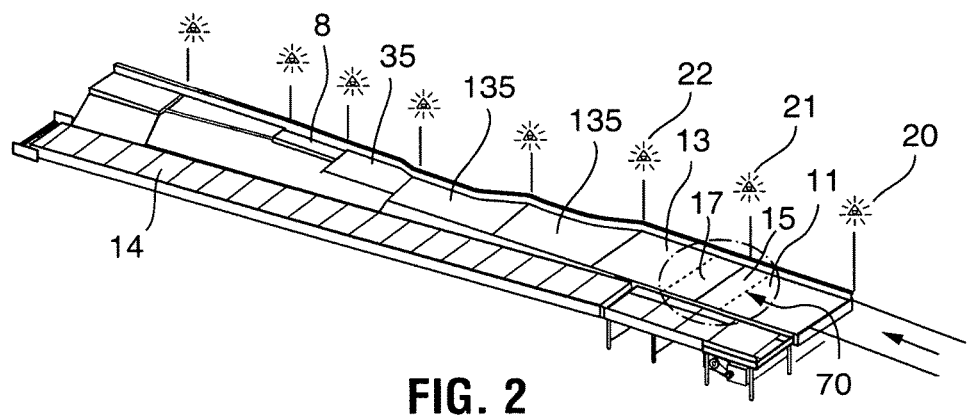
FIG. 2 is a top view of a video based conveyor package management system of the present invention showing the camera field of view of the vision based bulk parcel flow management system where the inline conveyor speed is set to achieve a desired conveyor area utilization on a down stream conveyor including the percentage of camera field of view, the percentage of the feeding conveyor e of the desired occupancy after the merger.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the term "about" can be reasonably appreciated by a person skilled in the art to denote somewhat above or somewhat below the stated numerical value, to within a range of ±10%.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As shown in the FIGS. 1-30, a vision based item typing and separation apparatus utilizing a computerized camera vision system and slide sorter pop-up diverting conveyor and speed control system 10 provides a means for selecting and typing articles unloading from a transport such as a truck for sorting in a conveyance system.

The vision based bulk parcel flow management system comprises or consists of a camera based vision system that recognizes belt area utilization, and parcel count. A system with cameras positioned at flow entry points and at the slide sorter. The control algorithm requires recognition of individual items and the rate at which individual objects are passing, and the area utilization of the off-loading collector belt. Average parcel size can be considered as well. The present invention provides a means for increasing conveyor area and controlling density. The video based conveyor package management system may also identify, locate, or trace a package, parcel, or other item on the conveyor by its digital image or footprint.

For example, the current FDXG requirements for a control conveyor of a selected area and speed is 7,500 parcels per hour over 10 minutes, with two (one minute) slices at 8250 parcels per hour, (7500/12150=0.62=62% efficiency over 10 min test). The present invention provides a means of controlling the area utilization of the available conveyor surface to obtain an efficiency of up to 75% equivalent to 9,375 parcels per hour for the same conveyor. Moreover, a 15% increase of results in an increase of 8,625 parcels per hour for the video based conveyor package management system conveyor with area utilization in accordance with the instant invention.

Cameras are positioned at selected individual input points in wired or wireless communication with a computer including a process control algorithm to recognize incoming flow density, in terms of both belt utilization and throughput rate. These measures can be used to make changes to reduce parcel input flow, and could require stoppage of the feed line, if flow is too sparse or dense. Similarly, absence of flow could be recognized prompting an increase in speed of a selected input conveyor or input conveyors.

Cameras positioned to view the singulator surface are used in a similar matter to assess the buffer capacity utilization, primarily based on area coverage recognition. This feedback is used to dynamically adapt behavior of infeed lines. The use of web cams provides added benefits in terms of system control room visibility and recordation. Variations in parameters used to tune the system can be evaluated in a more efficient manner. Jams and other system problems are better recognized.

A plurality of cameras in communication with a computer processor and plurality of monitors and in communication with hand held display and communication devices such as smart phones, tablets, and lap top computers are used in a conveyor package management system. The system includes video cameras monitoring the number and size of the packages present a given area of an off-loading collector conveyor, and optionally the infeed conveyor, collector conveyor, singulator conveyor and sorting conveyor in a package handling system wherein the camera data is collected and analyzed to measure the available area or space on the conveyors and the density of packages thereon to maximize a desired density of packages on selected conveyor(s). The rate of speed of the off-loading collector conveyor providing packages is controlled as a function of occupancy on a receiver conveyor such as a slide sorter conveyor just prior to a singulator or other selected receiving conveyor. The computer feeds the camera package density information to the conveyor speed controllers to introduce packages from one or more feed conveyors from the collection conveyor wherein packages are detected by one or more cameras and the speed of selected conveyors is controlled for arrangement of the packages at optimal spacing or size to fill an area of a selected conveyor in the most efficient manner maximizing the density of the packages on a conveyor and throughput of the system and accordingly minimizing the number of conveyors required for the system. When the computer determines there is a enough space on one of the conveyor belts, for example, the collector belt, the computer tells the controller to add a package or packages by causing an infeed belt to add a package or packages to the space or vacant area on the collector belt.

In accordance with the present invention, there is provided a video/camera based conveyor package management system comprising, consisting of, or consisting essentially of a video camera or other digital or pixel detecting and/or recording devices controlled by a computer or microprocessor having an algorithm for interpretation of the camera images and control of the rate of conveyance of at least one conveying apparatus, at least one off-loading collector conveyor including separate sections of conveyor separately driven by individual motors with individual speed controllers, selected ones of the sections of the collector conveyor having means such as skewed rollers capable of urging a package to a selected side of the collector conveyor, a plurality of receiving or output conveyors including separate sections of conveyor separately driven by individual motors with individual speed controllers, first video cameras monitoring areas of the collector conveyor leading up to merge areas of each of the infeed conveyors with the collector conveyor, second video cameras monitoring areas of the infeed conveyor leading up to merge areas of each of the infeed conveyors with the collector conveyor, and a algorithm control program within the video computer capable of controlling speeds and movement of the sections of the various conveyor and of the sections of the off-loading collector conveyors based on a calculated amount of free space on a given collector section compared to a footprint of a package on an oncoming infeed conveyor, as calculated on a pixel by pixel basis. A singulator conveyor and/or slide sorting conveyor may be incorporated within the conveyor system and fed by the off-loading collector conveyor.

One preferred embodiment of the vision based bulk parcel flow management system, comprises or consists of a off-loading collector and feed conveyor and a receiving conveyor each one having independent drive motors; a transition zone between the feed conveyor and the receiving conveyor; a camera field of view of the selected transition zone; an inline feeding conveyor speed to achieve a desired conveyor area utilization on a down stream receiving conveyor according to the formula $V2=V1 \times 2 \times (DO\%)/(RCO\%+FCO\%)$ where V is volume, DO is Desired Occupancy, RCO is Receiving Conveyor Occupancy, and FCO is Feeding Conveyor Occupancy. A camera and preferably two cameras provide a selected field of view. The off-loading collector and feeding conveyor has a selected occupancy defined zone and a receiving slide sorter conveyor has a selected occupancy defined zone including a section selected included a percentage of the desired occupancy after the merger. The slide sorter receiving conveyor has a selected occupancy defined zone and a conveyor area including a desired occupancy zone at a selected position. The transition section between the off-loading collector and feeding conveyor and the receiving slide sorter conveyor merges the parcels from one to another. A computer for controls the conveyor speed and movement based upon signals received from the cameras identifying gaps between packages on the slide sorter receiving conveyor of sufficient space for insertion of an additional package from the off-loading collector feeding conveyor.

More particularly, the video based conveyor area utilization system comprises or consists of an off-loading collector feed conveyor and a slide sorter receiving conveyor which may include separate sections of conveyor modules independently driven by individual motors with individual speed controllers. The off-loading collector feed conveyor includes at least one section independently driven by individual motors with an independent speed controller. At least one slide sorter downstream of the off-loading conveyor; a first video camera monitoring a selected areas of the off-loading collector conveyor provides a field of view to determine a receiving slide sorter conveyor occupancy percentage (RCO %); a second video camera monitoring a selected areas of the off-loading collector feed conveyor providing a field of view to determine a feeding conveyor occupancy percentage (FCO %). A control program within the video computer capable of controlling a rate of speed of the slide sorter receiving conveyor and a rate of speed of the off-loading collector feed conveyor based on a calculated amount of free space area available on a given receiving section compared to an area of a package conveyed on the off-loading collector feed conveyor. The feed speed is calculated and controlled based on digital camera data to measure the available area and the size, width, height, length, footprint, dimensions and shape prior to reaching the receiving conveyor. The slide sorter receiver conveyor speed is calculated and controlled based on digital camera data to measure the available area on the slide sorter of subsequent receiver conveyors. The feed speed and the receiving conveyor speed is controlled to achieve a desired conveyor area utilization on a selected down stream conveyor according to the formula $V2=V1 \times 2 \times (DO\%)/(RCO\%+FCO\%)$ where V is volume, (DO %) is Desired Occupancy, RCO % is Receiving Conveyor Occupancy percent, and FCO % is Feeding Conveyor Occupancy percent.

A downstream singulator comprises a conveyor mechanism for conveying single-file articles in a forward direction while removing articles traveling laterally adjacent the single-file articles, the conveyor mechanism comprising first and second driven conveyor structures respectively forming first and second conveying lanes disposed in parallel as viewed in plan and situated immediately adjacent one another; the first and second conveying lanes applying first and second conveying forces, respectively, which are divergent relative to one another; the first conveying force including a forward directional component; the second conveying force including a lateral directional component extending away from the first lane to move articles away from the first lane that are out of contact with the first lane.

The photoelectric sensor, or photo eye, is a device used to detect the distance, absence, or presence of an object by using a light transmitter, often infrared, and a photoelectric receiver. There are three different functional types: opposed (through beam), retro-reflective, and proximity-sensing (diffused). A through-beam arrangement consists of a receiver located within the line-of-sight of the transmitter. In this mode, an object is detected when the light beam is blocked from getting to the receiver from the transmitter. A reflective arrangement places the transmitter and receiver at the same location and uses a reflector to bounce the light beam back from the transmitter to the receiver. An object is sensed when the beam is interrupted and fails to reach the receiver. A proximity-sensing (diffused) arrangement is one in which the transmitted radiation must reflect off the object in order to reach the receiver. In this mode, an object is detected when the receiver sees the transmitted source rather than when it fails to see it. As in retro-reflective sensors, diffuse sensor emitters and receivers are located in the same housing. But the target acts as the reflector, so that detection of light is reflected off the disturbance object. The emitter sends out a beam of light (most often a pulsed infrared, visible red, or laser) that diffuses in all directions, filling a detection area. The target then enters the area and deflects part of the beam back to the receiver. Detection occurs and output is turned on or off when sufficient light falls on the receiver. The detecting range of a photoelectric sensor is its "field of view", or the maximum distance from which the sensor can retrieve information, minus the minimum distance. A minimum detectable object is the smallest object the sensor can detect. More accurate sensors can often have minimum detectable objects of minuscule size.

The speed control slide sorter system disposed perpendicular to a pass through conveyor wherein the speed control improves efficiency in loading and utilizing available area on the belt and selects the conveyor speed to induce a diverter action according to sensors which detect portions of the irregular shaped packages, parcels, and bags which can be engaged by the pop-up belt at a selected time to slow the conveyor and engage the pop-up transfer conveyor without stopping the conveyor.

The conveyor sorting assembly includes a pop-up belt slide sorter moving transversely to the conveyor direction to place in the path of articles moving along a conveyor via a pass-through conveyor or a diverting conveyor. The slide sorter is mounted on a reversible belt drive and preferably has at least one diverting or receiving conveyor disposed in flow communication with the pass-through conveyor. The slide sorter speed control unit can include a variable speed motor and transfer rate or a multi-speed system so that items passing though the on-coming conveyor belt slows to a pre-selected slower or higher speed depending upon the physical characteristics of the package such as the size and shape of the package at a predetermined area of the conveyor. Large and/or irregular shaped packages can be sorted at high speed and diverted to a selected conveyor providing denser loading of conveyors and better utilization of space on the conveyor. Smaller envelopes and packages can be allowed to pass through based on their weight or density or other physical characteristics. The slide sorter speed control improves efficiency in loading and utilizing available area on the belt and selects the conveyor speed to induce a diverter action according to sensors which detect portions of the irregular shaped packages, parcels, and bags which can be engaged by the pop-up belt. The speed control slide sorter system is disposed perpendicular to a pass through conveyor wherein the speed control improves efficiency in loading and utilizing available area on the belt by selecting the conveyor speed to induce a diverter action according to sensors which detect portions of the irregular shaped packages, parcels, and bags which can be engaged by the pop-up belt.

The sensors provide input to a programmable logic control device, "PLC" which is a digital computer used for automation of industrial electrotechnical processes, such as control of machinery on factory assembly lines. PLCs are used in many machines, in many industries. PLCs are designed for multiple arrangements of digital and analog inputs and outputs, extended temperature ranges, immunity to electrical noise, and resistance to vibration and impact. Programs to control machine operation are typically stored in battery-backed-up or non-volatile memory. A PLC is an example of a "hard" real-time system since output results must be produced in response to input conditions within a limited time, otherwise unintended operation will result.

Items can be diverted without stopping the conveyor and bringing the item to rest prior to diverting the item with the pop-up slide sorter and the items are not brought to rest over the pop-up prior to it rising. The speed of the conveyor is reduced or increased prior to the pop-up transfer of an irregular shaped package as a function of the length of the item or the length of the first portion falling within close proximity to the conveying surface close enough that the pop-up belts can be expected to engage and impart a transverse force to discharge the item. Sensors detect areas of the item resting on the conveyor to effect cooperative engagement with the pop-up conveyor.

As shown in Figures, conventional slide sorter or pop-up conveyors 12 include at least one and typically a plurality of parallel belts 14 space apart and disposed between a selected number of parallel pop-up conveyor rollers 16. Pop-up belt spacing is typically around 4 to 12 inches, but can be any selected width. A single belt or multiple belts 14 can be employed together. The belts 14 can be raised and lowered above or below the surface of the pop-up conveyor 12 by various lift means such as a cam means 18. In one preferred embodiment, the belts 4 are about ¼ inch below the surface 20 of the in-coming conveyor 22 and out-going conveyor 24 when at rest in the inactive position. The belts 4 are raised a selected height above the conveyor rollers, typically about one-half to two and three quarters of an inch (½-2¾) above the in-coming conveyor 22 and out-going conveyor 24 to discharge items.

The pop-up belt slide sorter 12 moves transversely over a flow-through conveyor 22, 24. Items which are redirected via the pop-up conveyor 12 conveyed over an optional take-off roller mounted parallel and between the flow-through conveyor 22, 24 and diverting conveyor 26. The slide sorter 12 is mounted on a reversible belt drive and preferably has at least one diverting conveyor 26 disposed in flow communication with the pass-through conveyors 22, 24. Only items destined for the diverter or receiver conveyor 26 are discharged via the pop-up conveyor 12. Other items based on their size or physical characteristics can pass straight though the slide sorter 12.

Figure 3:
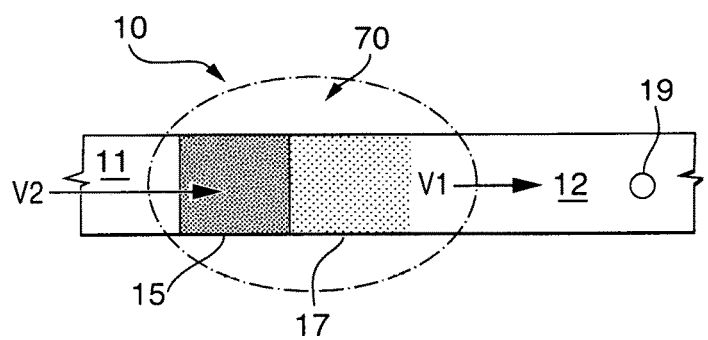
FIG. 3 is a perspective view of a section of a conveyor system as applied o a linear parcel singulator showing the feed conveyors and receiving conveyors and singulator wherein the roller and belt conveyors utilize independent motors to convey, arrange, and separate parcels and that the principle of the conveyor area utilization, and parcel count utilizing a system with cameras positioned at flow entry points of selected conveyors can be controlled to efficiently feed a singulator or other sorting device.
Figure 4:
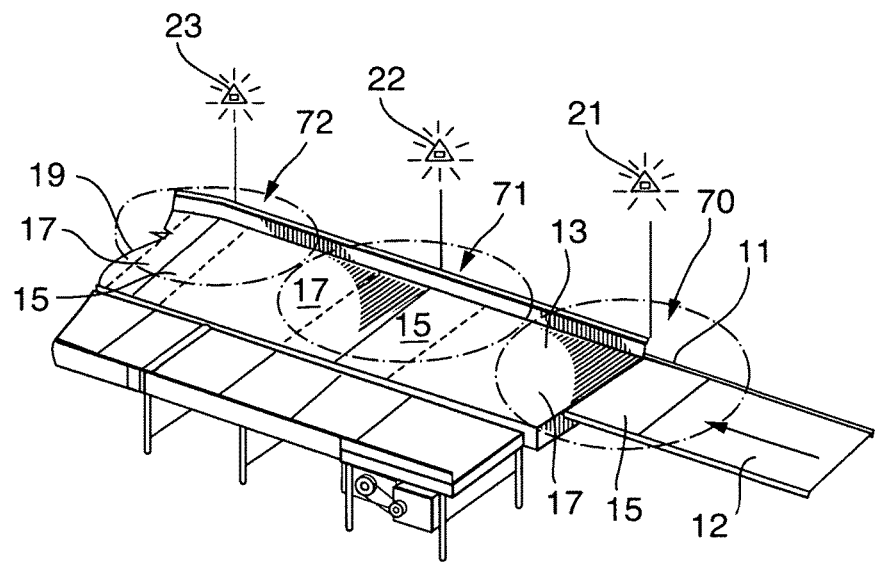
FIG. 4 shows the camera field of view of the transition section of a feed conveyor and receiving conveyor wherein each one of a plurality of cameras provide a field of view to define a feeding conveyor occupancy zone, and receiving conveyor occupancy defined zone at the transition point of merger of the upstream and downstream conveyors.

The cam means 18 used to raise the pop-up mechanism is shown in FIGS. 3 and 4 in the down position with a lobe 28 at the bottom. The proximity sensor 30 detects a screw 32 on the cam disc 34 indicating the home/down position, (i.e. not discharging). Proximity switches, for example three switches, detect the presence and position of the pop-up roller 16. In case of jam, the roller 16 is raised and the proximity gives to the programmable logic control, "PLC", indication and the PLC stops the conveyor for maintenance.

The speed control slide sorter system 10 is disposed perpendicular to the pass through conveyor wherein the speed control improves efficiency in loading and utilizing available area on the belts 22, 24 by selecting the conveyor speed to induce a diverter action according to sensors 102 on the slide sorter speed control unit which detect portions of the irregular shaped packages, parcels, and bags which can be engaged by the pop-up belts 14.

The pop-up belt slide sorter 12 moves transversely to the flow through conveyors 22, 24 in the path of articles moving along the pass through conveyors 22, 24. The slide sorter assembly 12 is mounted on a reversible belt drive and preferably has at least one diverting conveyor 26 disposed in flow communication with the pass-through conveyor 12.

A novel feature of the present invention is the apparatus and method for transverse transfer of items which are not brought to rest over the slide sorter pop-up conveyor 12 prior to the conveyor rising above the in-coming flow through conveyor 22 and out-going flow through conveyor 24 which continues to move in a forward direction before and during the pop-up conveyor 12 transfer of the item to the diverter conveyor 26 or to the take-off roll 25 disposed between the slide sorter 12 and diverter conveyor 26. The in-coming conveyor 22 merely slows down. Another novel feature of the present invention are the steps of creating and using an algorithm to reduce the speed of the in-coming conveyor 22 prior to the pop-up transfer as a function of the length of the item or the length of a selected portion of the item, such as the first portion, falling within close proximity to the conveying surface at a selected effective height, for instance ½ inch, which is close enough that the belts 14 of the slide sorter 12 engage and impart a transverse force to discharge the item.

The slide sorter speed control system comprises a three speed unit wherein the in-coming pass though conveyor belt 22 slows to a selected slower or higher speed depending upon the size and shape of the package at a predetermined area of the conveyor. Large and/or irregular shaped packages can be sorted at high speed and diverted to a selected conveyor 26 providing denser loading of conveyors and better utilization of space on the conveyor. The slide sorter speed control improves efficiency in loading and utilizing available area on the belts 22, 24 and selects the conveyor speed to induce a diverter action according to sensors 102 which detect portions of the irregular shaped packages, parcels, and bags which can be engaged by the pop-up belt 14. Items can be diverted without stopping the in-coming flow through conveyor 22 and bringing the item to rest prior to diverting the item with the pop-up slide sorter 12 and the items are not brought to rest over the pop-up conveyor 12 prior to it rising. The speed of the in-coming conveyor 22 is reduced prior to the pop-up transfer as a function of the length of the item or the length of the first portion falling within close proximity to the conveying surface close enough that the pop-up belts 14 can be expected to engage and impart a transverse force to discharge the item. Sensors 102 detect areas or a foot print of the item resting on the conveyor to effect cooperative engagement with the pop-up conveyor 12.

Figure 5:
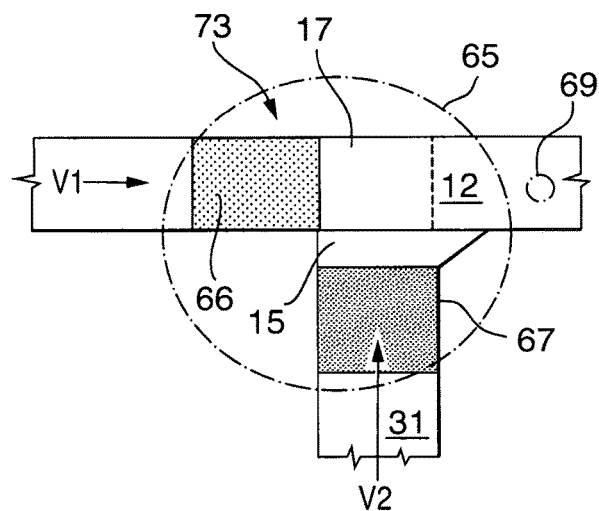
FIG. 5 is a top view showing the merger of a side transfer feed conveyor with an intersecting collector conveyor wherein the rate of speed of the conveyors is set to achieve a desired conveyor area utilization on the downstream portion of the collector conveyor, based on a camera field of view of the intersection based on the receiving conveyor occupancy defined zone, feeding conveyor occupancy defined zone and the desired occupancy after the merger.
Figure 6:
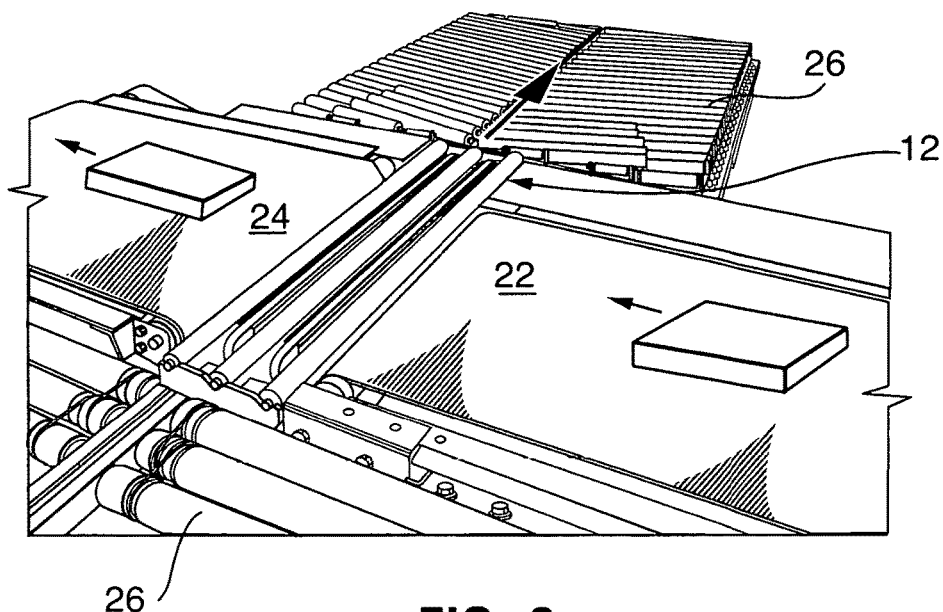
FIG. 6 shows a prior art embodiment with an in-coming flow-through conveyor with a slide sorter pop-up belt disposed at a 90 degree angle below the in-coming flow-through conveyor surface and a diverter conveyor in flow communication with and adjacent to the slide sorter.
Figure 7:
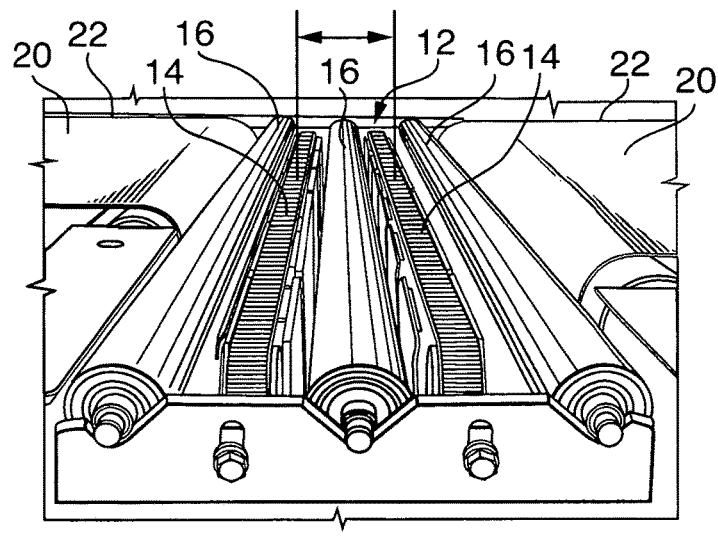
FIG. 7 is an enlarged view of a prior art slide sorter pop-up belt section showing belts disposed between conveyor rollers which convey flow through items to a take-off conveyor downstream of the slide sorter.
Figure 8:
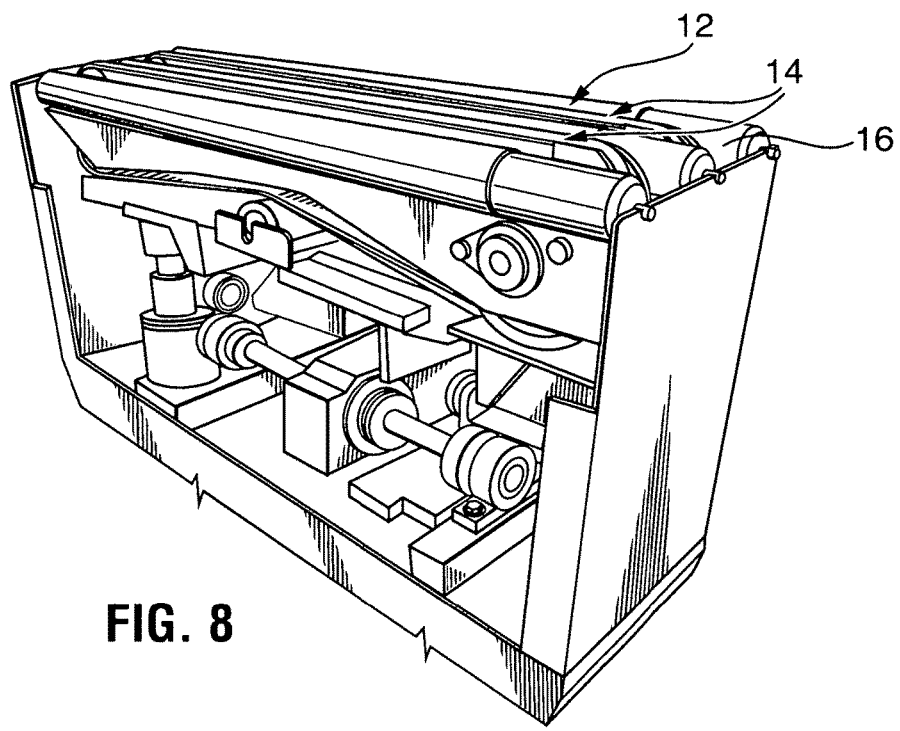
FIG. 8 shows proxi switches to provide feedback to the PLC regarding the position of the rollers of the slide sorter.
Figure 9:
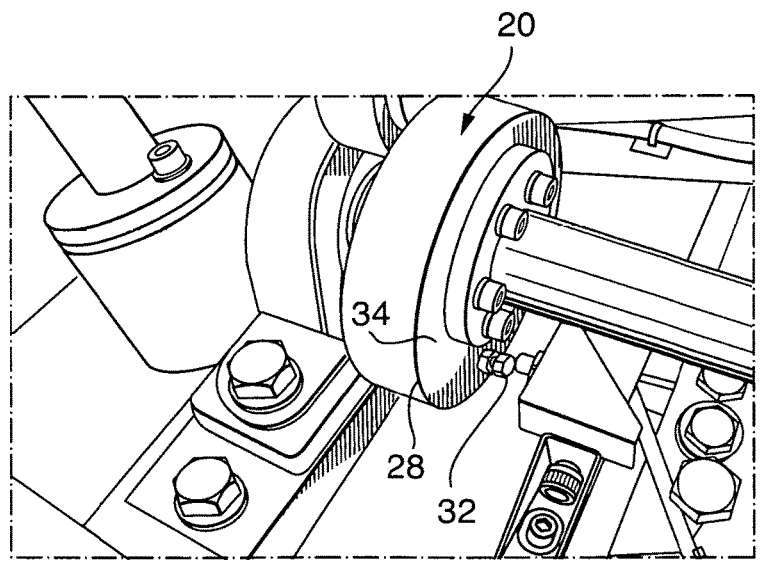
FIG. 9 shows the proximity sensor for detecting the home down position on the cam used to raise the pop-up belt between the conveyor rollers of the slide sorter.

The multiplexed light screen sensor 102 detects the full length of items as shown in FIG. 5 depicting a flow through conveyor 22, 24 having a 90 degree takeaway output or diverter conveyor 26 on both sides. The photocell (single beam) 104 is positioned to detect objects approximately ⅜" over the belt including portions of the item that can be engaged by pop-up belts 14. As further shown in FIGS. 6-13, the in-coming conveyor 22 is in flow communication with a slide sorter 12 with a pop-up belts 14 and a pair of opposing 90 degree take away output lanes of a diverter conveyor 26. Sensor inputs including a multiplexed light screen sensor 102 projecting at least one beam across the belt 22 to detect the length of items and at least one photocell (single beam) sensor 104 about ⅜ of an inch over the belt 22 projecting a beam across the belt 22 to detect portions of the item near or touching the surface 20 of the in-coming flow through conveyor that can be engaged by the pop-up belt 12 as depicted in FIGS. 5-7. As shown in FIG. 6, a sensor input is shown for an item 106 with an irregular base detected by photocell 104 and the height detected with the light sensor 102. FIG. 7 depicts the a sensor input for a foot print of an item with a regular base 108 and with an irregular base 110;

FIG. 8 shows an article footprint 112 of an article on the on-coming conveyor 22 measured to determine speed length by a first photo eye 104 and a second photo eye 106 to provide a value which can be converted by the encoder resolution to determine the maximum safe speed to approach the slide sorter. FIG. 9 shows a pair of footprints 116, 118, of an irregularly shaped article 114 on the on-coming conveyor 22 measured to determine speed length by the second photo eye 106 to provide a value which can be converted by the encoder resolution to determine the maximum safe speed to approach the slide sorter.

A novel feature of the slide sorter is the variable speed control system. A preferred embodiment of the present invention provides variable speed rates and a selection of at least three speed adjustments. The pop-up belt 14 has a speed of at least two meters/second (394 fpm) which is activated upon raising. The slide sorter 12 lift mechanism stays up based on item lift length measured with the second photo eye 106, plus a length adder using a feed belt encoder (length added approx 30 inches). A minimum gap is specified between articles, such as for example 36 inches.

The speed control method comprises or consists of the steps of activating the first photoelectric eye 104 detects the article moving on the conveyor. The second photoelectric eye or sensor 106 is positioned just above the conveyor belt and detects anything extending above a predetermined height such as within ⅜ inch of the belt. The maximum safe speed for the transfer of an article from the conveyor feed belt or in-coming flow through conveyor 22 to the pop-up conveyor 12 is calculated using either the item lift length (LL) which is equal to the pad length (SL) as shown in FIGS. 8-9 as measured with the second photoelectric eye 106 if flat, or the first contact pad length (SL) measured with the second photoelectric eye 106. The maximum safe speed (FPM)=5×SL+100, where SL is he length in inches (converted for the encoder resolution and empirical test data). The resulting value is rounded down to a selected increment such as 100, 200, or 300 feet per minute (fpm). The speed length is measured by the second photo eye 106. The hit point (raise point) is then determined. The slowdown point is determined for raising the slide sorter pop-up conveyor 12 when the front of the item crosses the first lift rail. For instance, where the hit point is 131 at 300 feet per minute the slow down is 120; when the hit point is 134 at 200 feet per minute the slow down is 125, and when a hit point is 139 at 100 feet per minute the slow down of 126.

FIG. 11 shows a graph of speed vs. speed length showing the Slide Sorter Safe Speed Maximum for a selected type of article.

The pop-up speed control=2 m/s (394 fpm), activated upon raising. The lift mechanism stays up based on the item lift length (LL) measured with the second photoelectric eye, plus a length adder using the feed belt encoder where (length adder is approx 30 inches). The acceleration and deceleration rate on slowdown and speed=0.3 G's.

An example providing a minimum gap distance of 36 inches the travel distance calculations are as follows:

| vi (fpm) | vf (fpm) | vi (in/s) | vf (in/s) | accel g's | a (in/s^2) | $Vf^2 = Vi^2 + 2as$ $s = (Vf^2 - Vi^2)/2a$ dist (in) |
|---|---|---|---|---|---|---|
| 300 | 200 | 60 | 40 | 0.3 | 115.8 | 8.6 |
| 300 | 100 | 60 | 20 | 0.3 | 115.8 | 13.8 |
| 100 | 300 | 20 | 60 | 0.3 | 115.8 | 13.8 |
| 200 | 300 | 40 | 60 | 0.3 | 115.8 | 8.6 |

If an article is to be speeded up from 100 fpm to 300 fpm, then slowed down to 100 fpm to sort again, a trailing edge of the previous 13.8 inches acceleration plus 13.8 inches deceleration plus 6 inches of lift belt spacing ahead of the item to be sorted or 33.6 inches belt feed (B-F) using 0.3 G's.

The sensors 102, 104, 106 provide input to control the speed of the in-coming flow through conveyor 22 using a PLC for decreasing the conveyor 22 speed prior to the pop-up conveyor 12 transfer as a function of the length of the item or the length of the first portion falling within close proximity to the conveying surface close enough that the pop-up belts can be expected to engage and impart a transverse force to discharge the item. The sensors detect areas of the item resting on the conveyor 22 to effect cooperative engagement with the pop-up conveyor 12 which includes a control system and variable speed conveyors. The slide sorter speed control conveyor 12 apparatus has three speeds including a feed belt slowing to either 100 or 200 from 300 feet per minute or to remain at 300 feet per minute prior to making a divert action. Different raising points create an "encoder pulse" for each speed and a slow down point "encoder pulse" from an induct eye.

The photo eye 104 just above the belt surface 20 detects anything within about ⅜ inch above the belt. The method of determining a maximum safe speed comprises or consists of the steps of calculating the item length measured with the photo eye if flat or a first contact point length measured with the photo eye. Thus the speed length is measured with the photo eye and the a hit point or raise point and a slowdown point is determined from the a lookup table. A pop-up is timed to raise when the front of an item crosses the first lift rail of the pop-up conveyor 12. The pop-up slide sorter mechanism and speed sensing control system can be diverted without stopping the flow through conveyors 22, 24 and bringing the item to rest prior to diverting the item with the pop-up slide sorter 12. In addition, it is not necessary to bring the items to rest over the pop-up prior to it rising.

Figure 13:
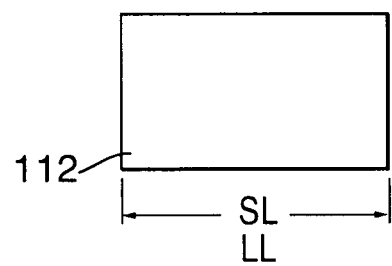
FIG. 13 shows a footprint of an article on the on-coming conveyor measured to determine speed length by the second photo eye to provide a value which can be converted by the encoder resolution to determine the maximum safe speed to approach the slide sorter.

FIG. 13 shows the in-coming and out-going flow through conveyors, 22, 24 respectively, having an in-line pop-up slide sorter 12 paired with a take-off roll 25 and diverter or receiver conveyor 26. A parallel takeaway configuration including a multiplexed light screen sensor 102 is shown with photocell sensors 104 and 106.

Figure 14:
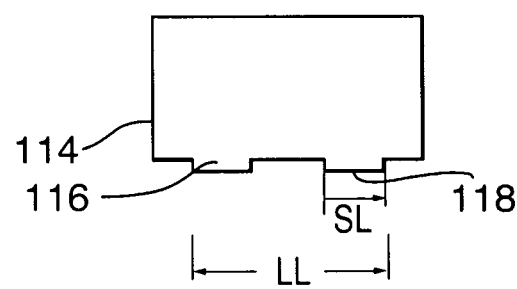
FIG. 14 shows a pair of footprints of an irregularly shaped article on the on-coming conveyor measured to determine speed length by the second photo eye to provide a value which can be converted by the encoder resolution to determine the maximum safe speed to approach the slide sorter.
Figure 15:
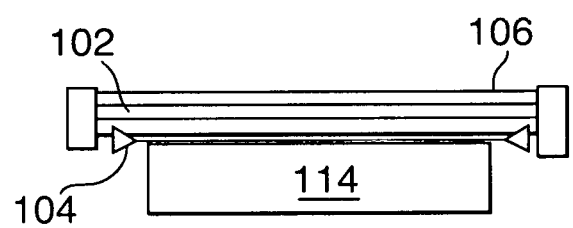
FIG. 15 is an cross section view of the in-coming flow-thorough conveyor showing the position of the first photo eye and second photo eye.
Figure 16:
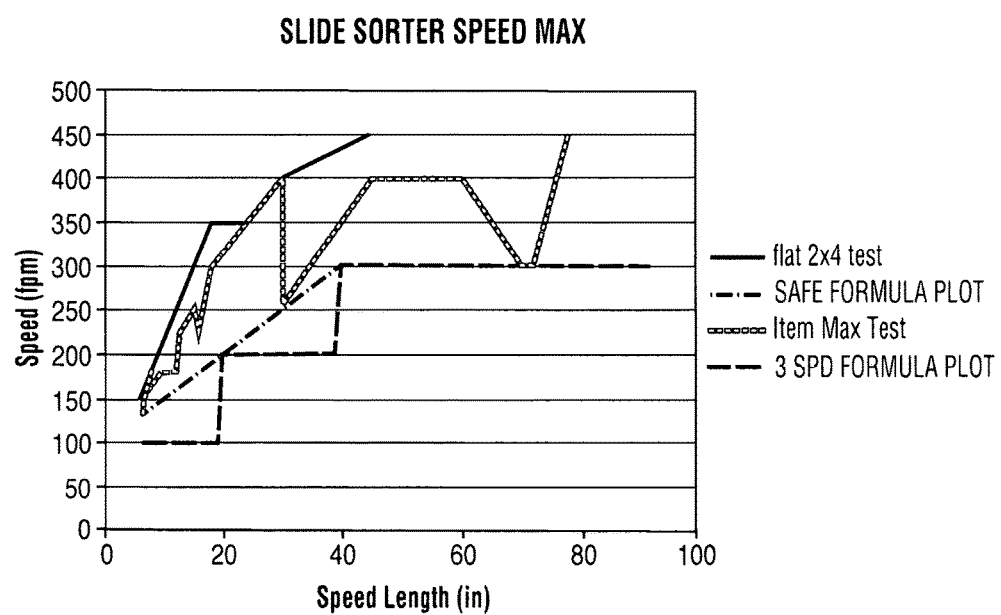
FIG. 16 shows a graph of the Slide Sorter Speed Maximum flow rate based on speed vs speed length.

The embodiment shown in FIGS. 14-16 show a perspective view of the in-coming conveyor 22 and out-going flow through conveyor 24 with a slide sorter pop-up transfer conveyor 12 disposed there between in flow communication with a adjacent a take-off roller 25 extending parallel to the flow through conveyors 22, 24 and normal to the slide sorter 12, with the diverter 26 or receiver conveyor extending the length of the take off roller 25. The diverter conveyor 26 rollers 28 are disposed at a selected angle of up to 40 degrees and preferably between 20 and 25 degrees with the outward distal end 30 of the rollers 28 positioned rearward of the inner distal end 32 of the rollers 28 adjacent the take-off roller creating forward and lateral motion toward the outside wall 34 and leading edge of the diverter conveyor 26. An optional deflector 34 is mounted on the downstream end of the take-off roller 25 to deflect any items which have not cleared the flow through conveyor or are not in proper orientation for transfer via the diverting conveyor 26.

Figure 17:
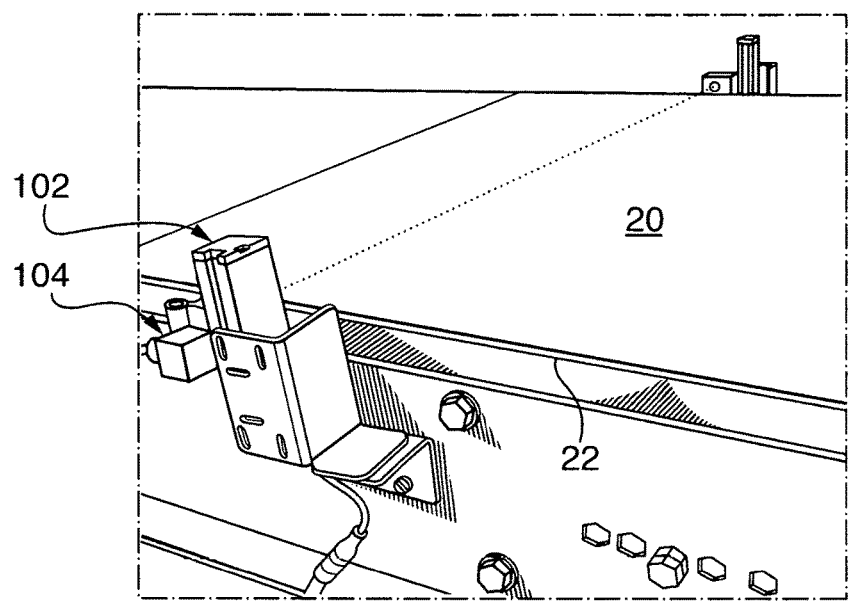
FIG. 17 is an enlarged view of a multiplexed light screen and photocell disposed on a and portions of an item that can be engaged by pop-up belts.

As best illustrated in FIG. 17, a sectional end view of the pop-up transfer conveyor speed control assembly shows the in-coming conveyor 22 and the multiplexed light screen sensor 102 and photocell or photo eyes 104 and 106. The longitudinal article resting on the belts 14 of the pop-up transfer conveyor 12 is shown in the raised position in a partially rotated counter clockwise orientation. It is supported by the take-off roller 25 which extends above a portion of the diverter 26 or receiver conveyor, wherein the elevation of the pop-up belt 12 in the raised position is elevated above (about ⅜ inch) the in-coming conveyor 22 and outgoing flow through conveyor 24 and is positioned at the same elevation as the take-off roller 25 (about ⅜ inch above the in-coming and outgoing flow through conveyor). The proximate distal ends 32 of the rollers 28 of the receiving or diverter conveyor 26 are positioned about ⅛ inch below the elevation of the take-off roller 25 and flow through conveyor 22, 24 with the receiving diverter conveyor 26 tilted upward and outward at a selected angle of from 1-35° with respect to the flow through conveyor so that articles come in contact with the receiving conveyor 25 extending over about 25% of the width of the receiving conveyor 26 and are pulled into the center of the conveyor due to the forward and lateral forces of the offset rollers 28.

Thus, the typing tunnel off-loading and sorting system take-off roller extends above a portion of said pop-up conveyor and an tilted receiving conveyor for receiving diverted articles. The tilted receiving conveyor or second receiving conveyor for receiving the diverted articles is positioned so that it has an edge adjacent the take-off roller so that its skewed offset roller conveyor surface is disposed below a top surface of the take-off roller. The tilted receiving conveyor is upward and away from the feed conveyor and pop-up conveyor outward at a selected angle of up to 35 degrees and preferably from 1-35° with respect to the surface of the feed conveyor for receiving articles from the take-off roller. Tilting the tilted receiving conveyor limits the lateral movement of the articles sliding over the offset skewed roller surface of the tilted receiving conveyor pulling the articles into a generally center region of the tilted receiver conveyor due to the forward and lateral forces of the skewed offset rollers.

Figure 18:
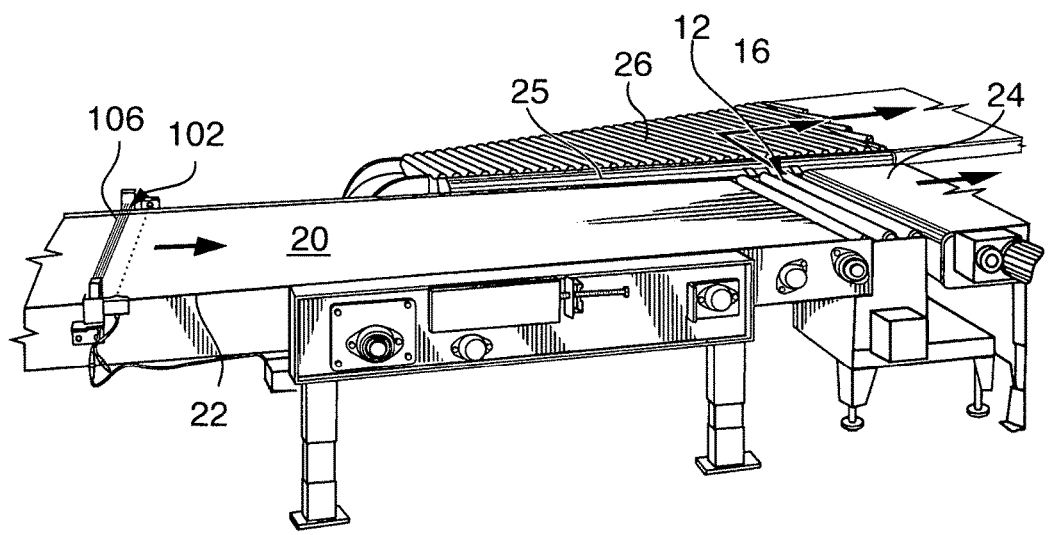
FIG. 18 is a flow through conveyor having an in-line pop-up slide sorter with a parallel takeaway configuration including a multiplexed light screen sensor and photocell sensor.
Figure 19:
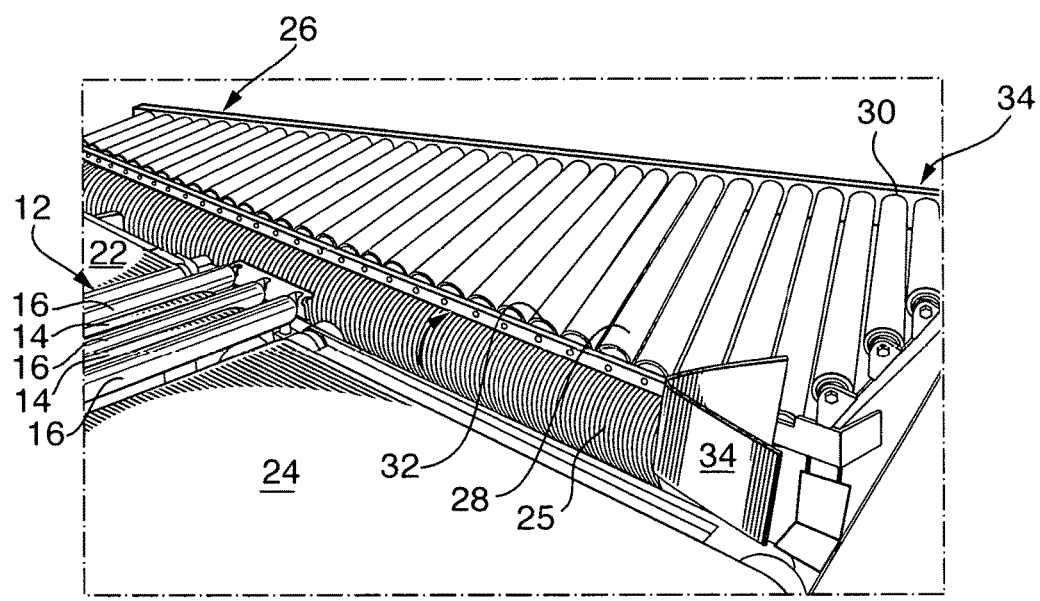
FIG. 19 is a perspective view of the in-coming and out-going flow through conveyors with a slide sorter pop-up transfer conveyor disposed there between, adjacent a take-off roller extending parallel to the flow through conveyor and normal to the slide sorter, with the diverter or receiver conveyor extending the length of the take off roller showing the diverter conveyor rollers disposed at a selected angle with the outside rollers rearward of the inside rollers adjacent the take-off roller creating forward and lateral motion toward the outside wall and the leading edge of the diverter conveyor disposed below the level of the take-off roller.
Figure 20:
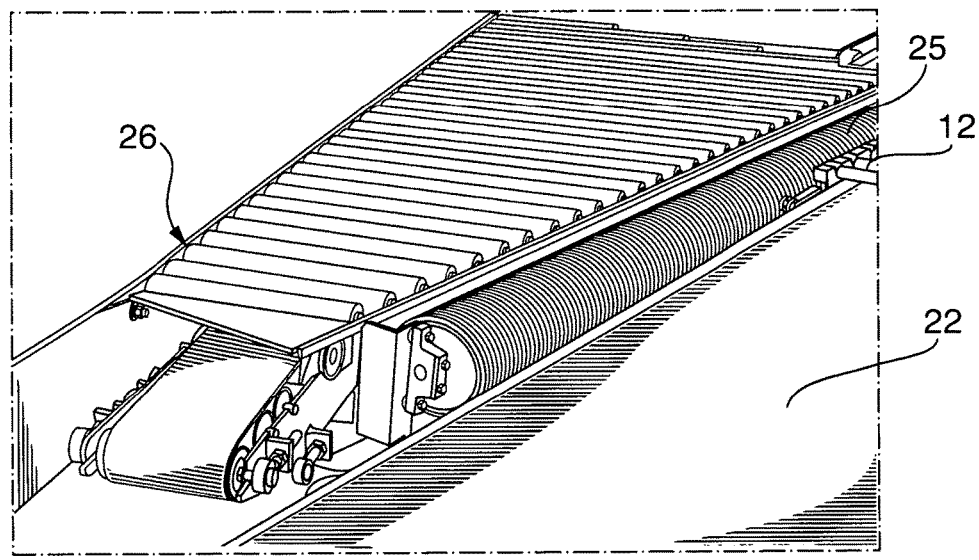
FIG. 20 is a downstream perspective view of the conveyor system shown in FIG. 19.
Figure 21:
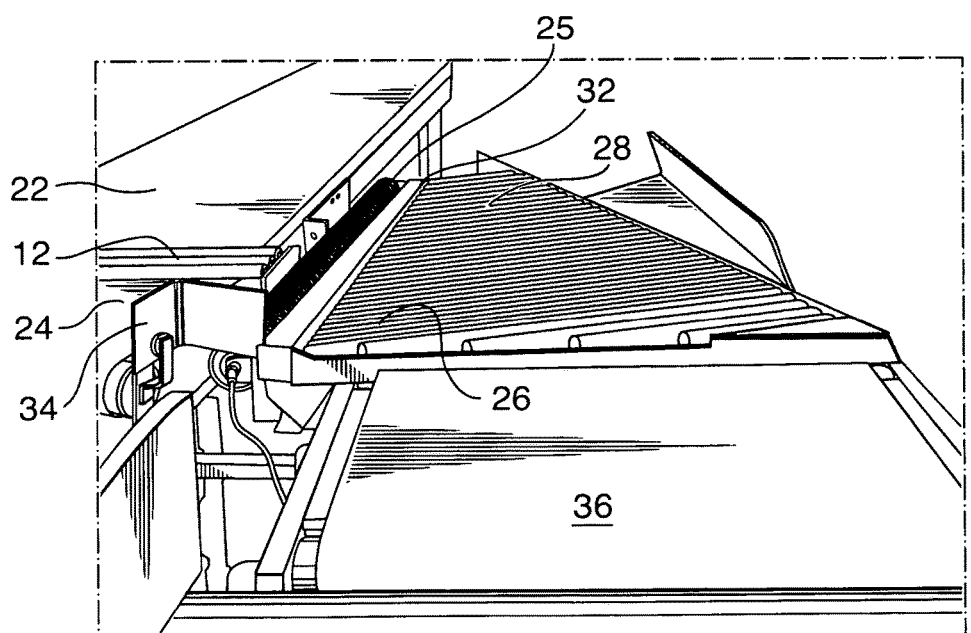
FIG. 21 is an upstream perspective view of the conveyor system shown in FIG. 19.
Figure 22:
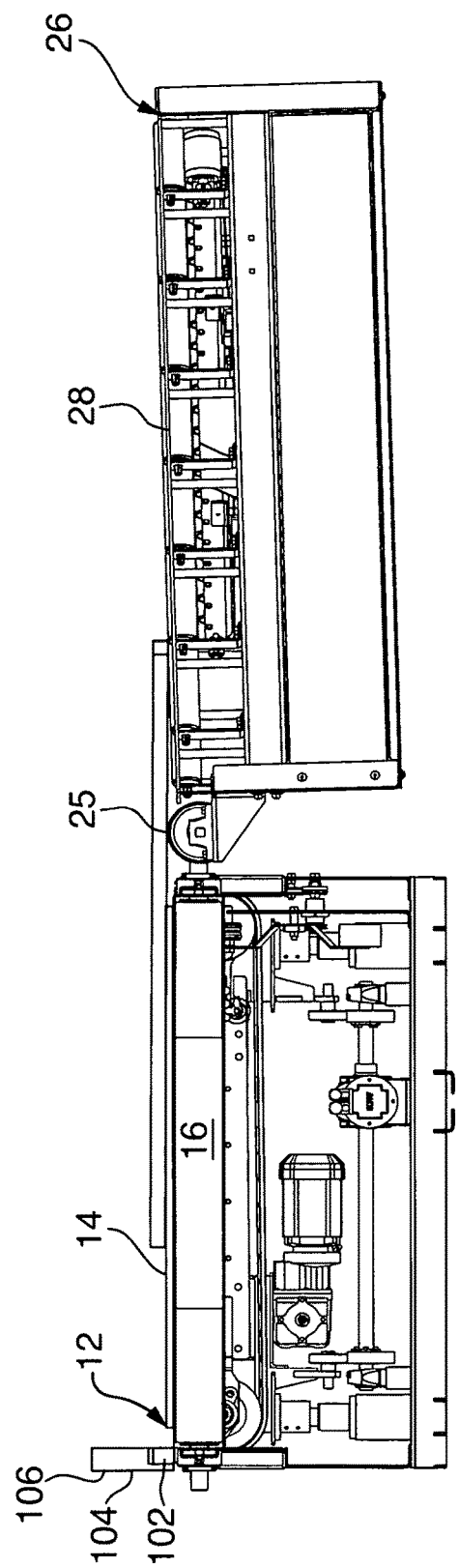
FIG. 22 is a sectional end view of the pop-up transfer conveyor speed control assembly showing the in-coming conveyor and the multiplexed light screen sensor and photocell or photo eye, and the longitudinal article resting on the belts of the pop-up transfer conveyor in the raised position partially rotated counter clockwise, and supported by the take-off roller and extending above a portion of the diverter or receiver conveyor, wherein the elevation of the pop-up belt is positioned above (about ⅜ inch) the in-coming and outgoing flow through conveyors and is positioned at the same elevation as the take-off roller (about ⅜ inch above the in-coming and outgoing flow through conveyor, and the rollers of the receiving or diverter conveyor are positioned about ⅛ inch below the elevation of the take-off roller and flow through conveyor with the receiving diverter conveyor tilted upward at a selected angle of from 1-35° with respect to the flow through conveyor so that articles come in contact with the receiving conveyor after extending over about 25% of the width of the receiving conveyor.
Figure 23:
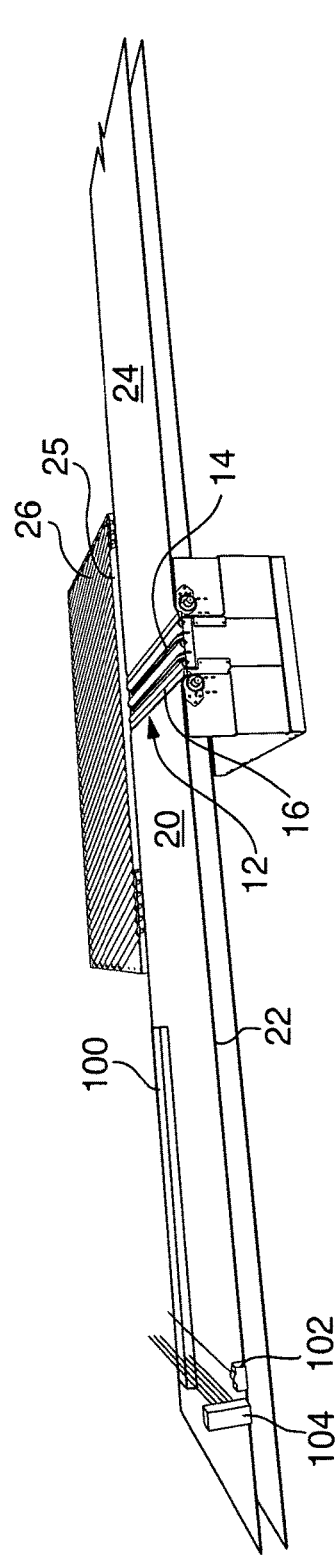
FIG. 23 is a perspective view of the pop-up transfer conveyor speed control assembly showing a longitudinal article resting on the in-coming conveyor and passing through the multiplexed light screen sensor and photocell or photo eye, the pop-up transfer conveyor in the down rest position, the take-off roller and the diverter or receiver conveyor, and the outgoing flow through conveyor.
Figure 24:
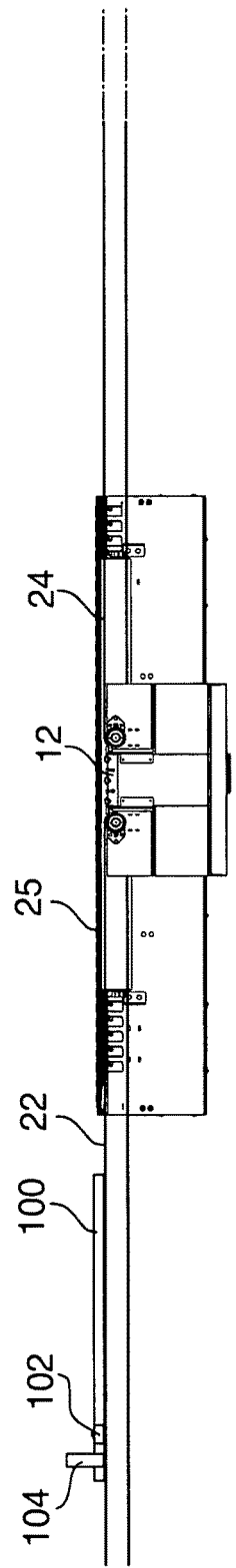
FIG. 24 is a side view of the pop-up transfer conveyor speed control assembly showing a longitudinal article resting on the in-coming conveyor and passing through the multiplexed light screen sensor and photocell or photo eye, the pop-up transfer conveyor in the down rest position, the take-off roller and the diverter or receiver conveyor, and the outgoing flow through conveyor.
Figure 25:
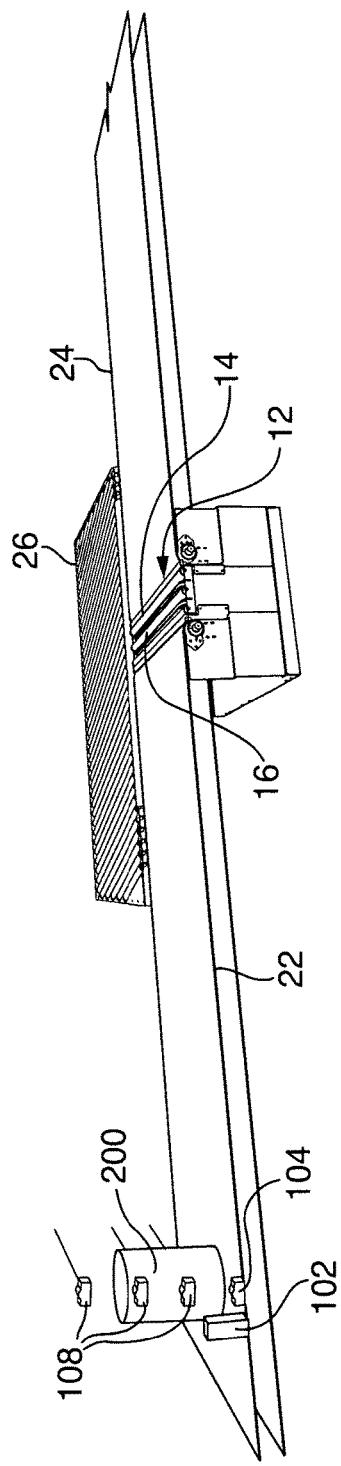
FIG. 25 is a perspective view of the pop-up transfer conveyor speed control assembly showing a tall cylindrical article such as a drum or bucket resting an end on the in-coming conveyor and passing through the multiplexed light screen sensor and photocell or photo eye in addition to an array of sensors is positioned to measure the height of the item, in addition to its length, with the pop-up transfer conveyor shown in the down resting position below the surface of the flow through conveyor, and showing the take-off roller and the diverter or receiver conveyor.
Figure 26:
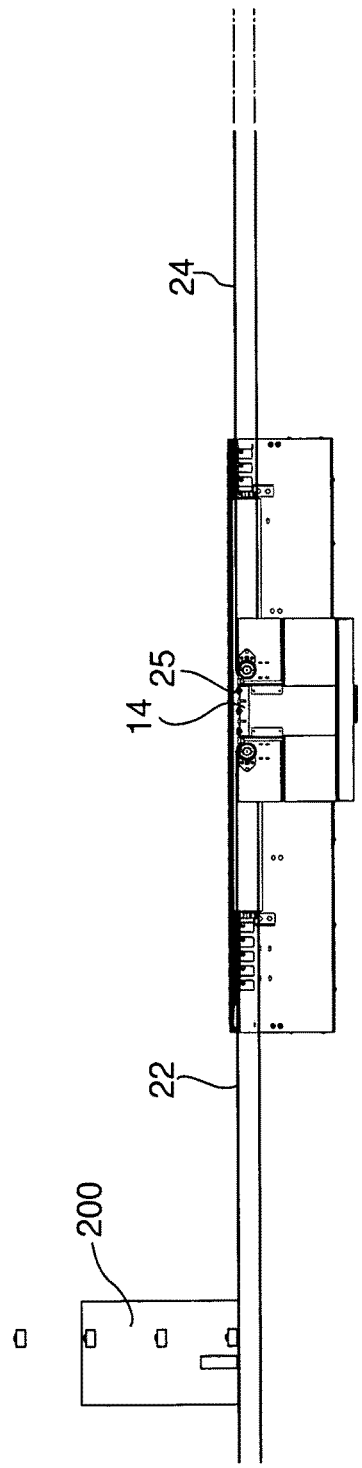
FIG. 26 is a side view of the pop-up transfer conveyor speed control assembly showing a drum resting on the in-coming flow through conveyor and passing through the multiplexed light screen sensor and photocell and array of height sensors with the pop-up transfer conveyor in the down rest position adjacent the take-off roller and the diverter or receiver conveyor.
Figure 27:
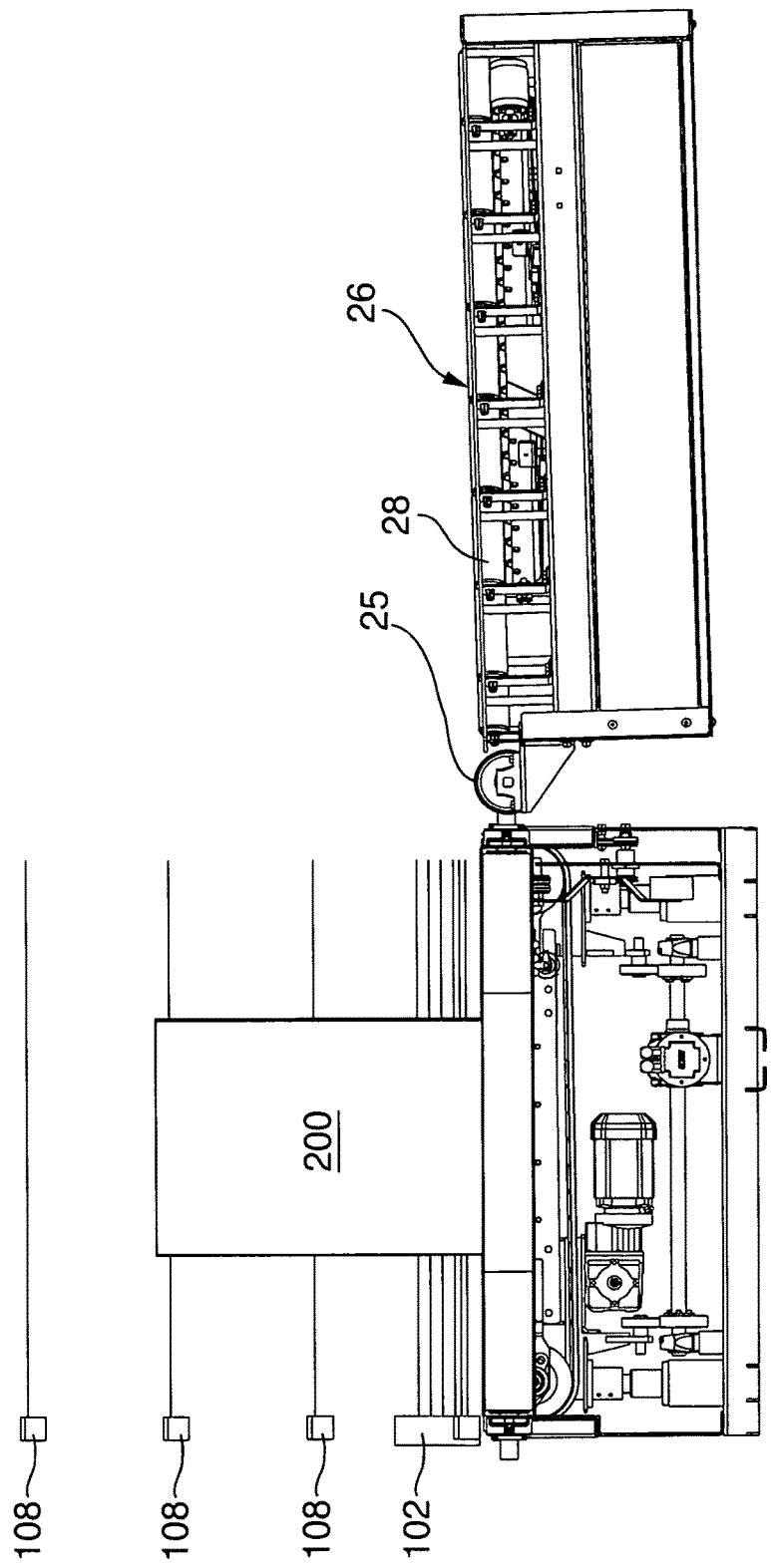
FIG. 27 is a sectional end view of the pop-up transfer conveyor speed control assembly showing a drum resting on the in-coming flow through conveyor and passing through the multiplexed light screen sensor and photo eye and the array of height sensors with the pop-up transfer conveyor in the down resting position adjacent the take-off roller and the receiver conveyor shown at an inclined angle of from 1 to 35°.
Figure 28:
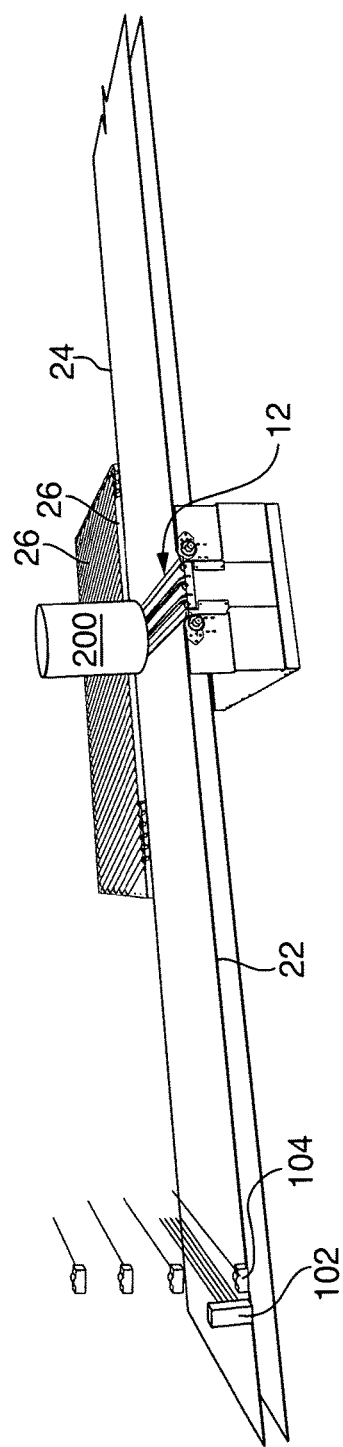
FIG. 28 is a perspective view of the pop-up transfer conveyor speed control assembly showing the in-coming conveyor and the multiplexed light screen sensor, photocell, and array of height sensors with the drum supported on the raised belts of the pop-up transfer conveyor above the in-coming and out-going flow through conveyor surface in the up raised position supporting the drum above the incoming flow through conveyor surface and level with the take-off roller and level with a portion (about 25% of the width) of the adjacent receiver conveyor rollers.
Figure 29:
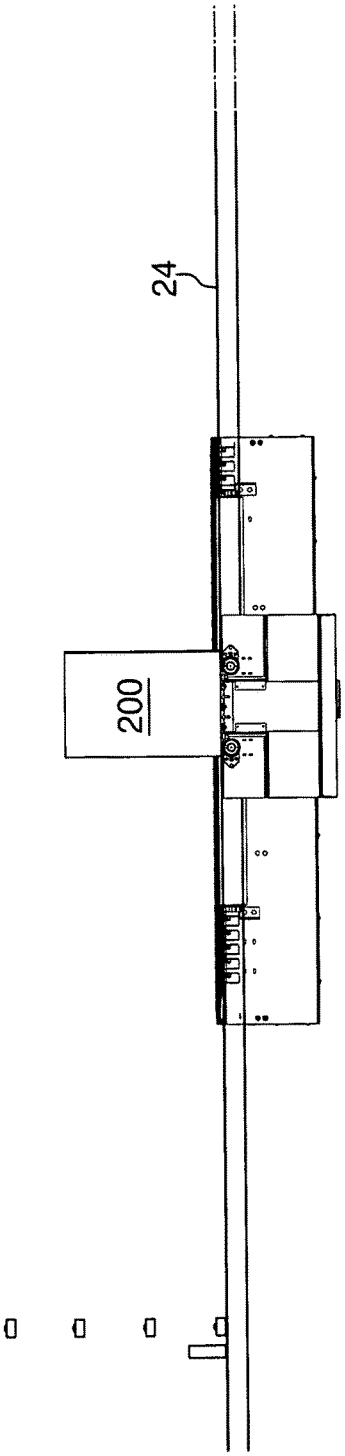
FIG. 29 is a side view of the pop-up transfer conveyor speed control assembly showing the in-coming conveyor and the multiplexed light screen sensor, photocell, and array of height sensors and the drum supported on the belts of the pop-up transfer conveyor in the raised position.
Figure 30:
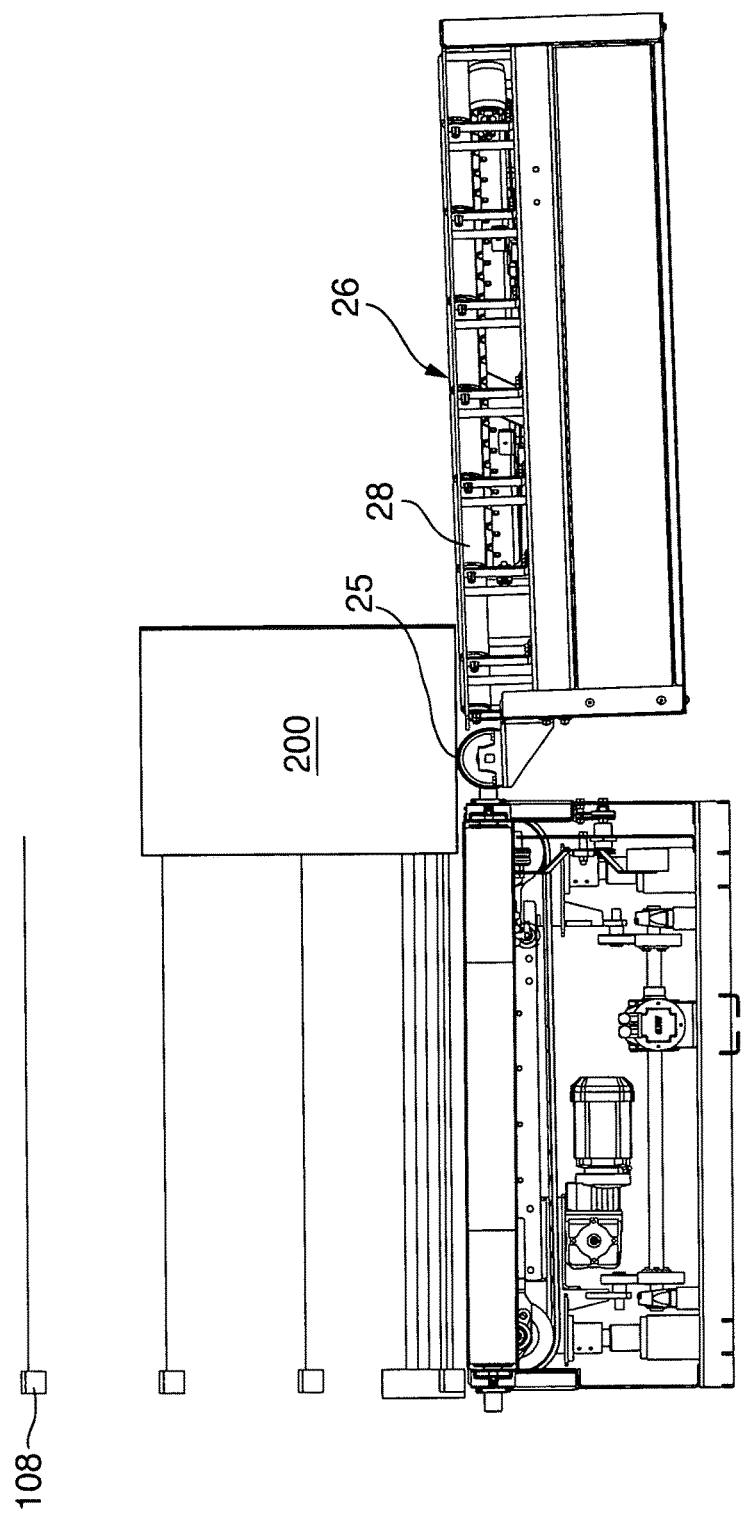
FIG. 30 is a sectional end view of the pop-up transfer conveyor speed control assembly showing the in-coming conveyor and the multiplexed light screen sensor and photocell or photo eye, and the drum resting on the belts of the pop-up transfer conveyor, the take-off conveyor, and a portion of the receiver conveyor rollers all in horizontal alignment level with one another.

The pop-up transfer conveyor speed control assembly shown in FIG. 18, have a longitudinal article 100 resting on the in-coming conveyor 22 and passing through the multiplexed light screen sensor 102 and photocell or photo eye 104, the pop-up transfer conveyor 12 in the down rest position, the take-off roller 25 and the diverter or receiver conveyor 26, and the outgoing flow through conveyor 24. FIG. 19 shows a pop-up transfer conveyor speed control assembly showing a longitudinal article 100 resting on the in-coming conveyor 22 and passing through the multiplexed light screen sensor 102 and photocell or photo eye 104. The pop-up transfer conveyor 12 is shown in the down rest position below the take-off roller 25 which extends above the edge of the diverter or receiver conveyor 26.

FIGS. 20-23 illustrate the pop-up transfer conveyor speed control assembly showing the in-coming conveyor 22 and the multiplexed light screen sensor 102 and photocell or photo eye 104, and the longitudinal article 100 resting on the belts 14 of the pop-up transfer conveyor 12 in the raised position partially rotated counter clockwise, and supported by the take-off roller 25 extending above a portion of the diverter or receiver conveyor 29, wherein the elevation of the pop-up belt 14 is also positioned above (about ⅜ inch) the in-coming and outgoing flow through conveyors 22 and 24 respectively, at the same elevation as the take-off roller 25. The proximate end of the rollers 28 of the receiving or diverter conveyor 26 are positioned a selected distance below the elevation of the take-off roller 25, for instance ⅛ inch. The conveyor rollers 28 of the diverter conveyor 26 are tilted upward and outward at a selected angle of from 1-35° with respect to the flow through conveyor 22, 24 so that articles extend over a portion (about 25%) of the receiving conveyor 26 before coming into contact with the rollers 28 in order to center the item 100 with respect to the conveyor rollers 28 and aid in rotation and orientation of longitudinal items 100.

Tall items 200 can tip over as the pop-up transfer belts 14 lift the article or parcel to transfer it from the in-coming flow through conveyor 22 to the diverter conveyor 26 if the flow through conveyor is running too fast. The pop-up speed control mechanism can utilize and additional photo eye array 108 for detecting the height of an article on the flow through conveyor 22 and controlling the speed prior to encountering the pop-up conveyor 12 to prevent the article from tipping over during the cross over to the diverter conveyor 26. The speed is adjusted in proportion to the length to height ratio of the article.

For example, an item that is 1.5 ft tall with a 3 ft base (3/1.5=ratio of 2) might be able to be handled at 300 fpm; an item that is 1.5 ft tall with a 2 ft base (2/1.5=ratio of 1.3) may only be safely handled without tipping at 200 fpm; and an item that is 1.5 ft tall with a 1 ft base (1/1.5=ratio of 0.7) may only be safely handled without tipping at 100 fpm. An array of sensors 108 is positioned to measure the height of the item, in addition to its length. The length to height can be determined via processor, and safe handling speed can be commanded to the conveyor drive to enable safe sorting, without tipping the item over.

FIGS. 24-29 show the pop-up transfer conveyor speed control assembly 10 conveying a tall cylindrical article such as a drum 200 resting on an end on the in-coming conveyor 22 and passing through the multiplexed light screen sensor 102 and photocell or photo eye 104, 106 in addition to an array of height sensors 108 positioned to measure the height of the item, in addition to its length. The pop-up transfer conveyor 12 is shown in the "down" resting position below the surface of the flow through conveyor 22, 24, and showing the take-off roller 25 and the diverter or receiver conveyor 26.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification's presented herein above.

I claim:

1. A typing tunnel off-loading and sorting system comprising:
   an off-loading collector feed conveyor having an independent drive motor in flow communication with a transport loaded with parcels;
   a transition zone selected on said off-loading collector feed conveyor;
   at least one camera having a field of view of said transition zone;
   controller means for maintaining an off-loading collector feed conveyor speed to achieve a desired conveyor area utilization on a down stream receiving conveyor based on said at least one camera field view of said transition zone, a down stream receiving conveyor occupancy defined zone, a feeding conveyor occupancy defined zone and a desired occupancy after the merger;
   a slide sorter conveyor speed control system, comprising a first conveyor positioned to carry articles in the direction of a longitudinal axis of said conveyor, a slide sorter pop-up conveyor positioned across said longitudinal axis of said conveyor including means operative to move said pop-up conveyor between a home position in which a pass-through element receives articles from said conveyor and transfers them along the direction of said longitudinal axis, and a diverting position in which a pop-up element receives said articles from said conveyor and transfers selected articles away from the direction of said longitudinal axis, a multiplexed light screen to detect the full length of said articles, a photocell over said conveyor surface to detect a portions of said articles that can be engaged by said pop-up conveyor, and a computer control means for controlling actuation of said pop-up conveyor in response to data transmitted from said multiplexed light screen and said photocell;
   wherein said selected articles can be diverted upon decreasing the speed of the conveyor prior to diverting said selected articles with said pop-up conveyor and said articles are moving forward as said pop-up conveyor is rising, and the speed of said conveyor is reduced prior to the transfer of said selected articles to said pop-up conveyor as a function of the length of said articles or the length of a first portion of said articles falling within close proximity to a conveying surface that is close enough that said pop-up conveyor can be expected to engage and impart a transverse force to discharge selected articles.

2. The typing tunnel off-loading and sorting system of claim 1, further comprising:
   an off-loading collector or feed conveyor including an independent drive motor in flow communication with a transport loaded with parcels;
   a receiving conveyor having a selected occupancy defined zone;
   a section selected included a percentage of the desired occupancy after the merger;
   a receiving conveyor having a selected occupancy defined zone;
   a conveyor area including a desired occupancy zone at a selected position;

a transition section between said feeding conveyor and said receiving conveyor for merging the parcels from one to another; and a computer for controlling said conveyor speed and movement based upon signals received from said cameras identifying gaps between packages on said receiving conveyor of sufficient space for insertion of an additional package from said feeding conveyor.

3. The typing tunnel off-loading and sorting system of claim 1, further including sensors detecting areas of the item resting on the conveyor to effect cooperative engagement with the pop-up conveyor.

4. The typing tunnel off-loading and sorting system of claim 1, including a diverter conveyor in flow communication with said slide sorter conveyor connecting at one end thereof and extending away from said pass-through conveyor.

5. The typing tunnel off-loading and sorting system of claim 1, wherein said diverting element comprises a roller conveyor.

6. The typing tunnel off-loading and sorting system of claim 1, further comprising a tilted receiving conveyor positioned on an opposite side of said slide sorter.

7. The typing tunnel off-loading and sorting system of claim 1 including a take-off roller extending above a portion of said pop-up conveyor and an tilted receiving conveyor for receiving diverted articles.

8. The typing tunnel off-loading and sorting system of claim 7, said tilted receiving conveyor for receiving diverted articles is positioned having an edge adjacent said take-off roller with a skewed offset roller conveyor surface disposed below a top surface of said take-off roller and said tilted receiving conveyor being tilted upward and outward at a selected angle of from 1-35° with respect to said feed conveyor for receiving articles from said take-off roller and limiting lateral movement of said articles over the width of said tilted receiving conveyor pulling said articles into a center region of said tilted receiver conveyor due to the forward and lateral forces of said skewed offset rollers.

9. A typing tunnel off-loading and sorting system comprising:
   a) vision based bulk package conveyor flow management system, comprising:
      a feed conveyor and a receiving conveyor each one having independent drive means;
      a transition zone between said feed conveyor and said receiving conveyor;
      at least one camera providing a selected field of view of said selected transition zone, a selected occupancy zone, or said selected transition zone and said selected occupancy zone;
      said feed conveyor, said receiver conveyor, or both said feed conveyor and said receiver conveyor conveying at a selected speed or time to achieve a desired conveyor area utilization on a down stream receiving conveyor based on said at least one camera providing a selected field of view of said selected transition zone, a down stream receiving conveyor occupancy defined zone, a feeding conveyor occupancy defined zone and a desired occupancy after the merger;
      said feed conveyor having a selected occupancy defined zone;
      said receiving conveyor having a selected occupancy defined zone;
      a transition section between said feed conveyor and said receiving conveyor for merging a plurality of packages from one to the other;
      said selected transition section including a percentage of the desired occupancy of said receiving conveyor after the merger of said packages from said feed conveyor to said receiving conveyor;
      a conveyor area including a desired occupancy zone at a selected position; and
      a computer for controlling said conveyor speed and movement based upon signals received from said cameras identifying gaps between said packages on said receiving conveyor of sufficient space for insertion of an additional package from said feeding conveyor;
   b) a slide sorter conveyor speed control apparatus in flow communication with said vision based bulk package conveyor flow management system, comprising:
      a first upstream conveyor conveying a first group of articles of a selected size, shape, irregular base, marking, or other characteristic and a second group of articles of a selected different size, shape of characteristic along a longitudinal axis of said first upstream conveyor;
      a second downstream conveyor conveying said first group of articles along a longitudinal axis of said second downstream conveyor;
      a pop-up conveyor disposed between and in flow communication with said first upstream conveyor which passes through said first group of articles, said pop-up conveyor diverting and conveying said second group of articles in a direction away from said second downstream conveyor;
      said pop-up conveyor comprising:
      i) a frame including a plurality of spaced apart parallel conveyor rollers disposed normal to and at about the same height as said first upstream conveyor and said second downstream conveyor for receiving and conveying and passing through said first group of articles from said first upstream conveyor to said second downstream conveyor, including a motor and drive means for rotating said conveyor rollers;
      ii) at least one pop-up belt disposed between said spaced apart conveyor rollers, said at least one pop-up belt spaced apart from and in parallel alignment with said conveyor rollers including a motor and drive means for rotating said at least one pop-up belt;
      iii) said at least one pop-up belt resting a selected distance below said conveyor rollers in an inactive position during conveying said first group of articles from said first upstream conveyor passing over and through said conveyor rollers of said pop-up conveyor to said second downstream conveyor;
      iv) said pop-up conveyor including cam means for raising said at least one pop-up belt a selected distance above said conveyor rollers conveying and diverting said second group of articles from said second downstream conveyor;
      at least one multiplex light screen sensor detecting a full length of said first group of articles and said second group of articles;
      at least one photocell including a transmitter projecting at least a single beam a selected distance over a surface of said first upstream conveyor and a receiver for receiving said at least a single beam detecting portions of articles of said first group of articles resting on a surface of said first upstream conveyor surface and detecting portions of articles of said second group of articles resting on a surface of said first upstream conveyor surface engageable by said at least one pop-up belt;

variable speed control means for controlling a conveying speed of said first up-stream conveyor;

computer control means in electrical communication with said variable speed control means and said pop-up conveyor motor and at least said first upstream conveyor for controlling actuation of said at least one pop-up belt of said pop-up conveyor in response to data transmitted from said at least one multiplex light screen sensor and said at least one photocell allowing said first group of articles to pass over said conveyor rollers and through said pop-up conveyor to said second downstream conveyor, and activating said cam means raising said at least one pop-up belt diverting said second group of articles away from said second downstream conveyor without stopping said first upstream conveyor and said second downstream conveyor;

said computer receiving input from at least one multiplex light screen sensor and controlling the optimal speed of said first up-stream conveyor based upon said full length of said article of said first group of articles and said portions of said second group of articles resting on said surface of said first up-stream conveyor for slowing said first up-stream conveyor and activating said pop-up conveyor raising said at least one belt of said pop-up conveyor to engage said portion of said selected article of said second group of articles to be diverted from said first group of articles, and said computer controls a duration said at least one belt remains activated based on said full length of said article to be diverted; and said computer controlling the speed of said first upstream conveyor and slowing said speed of said first upstream conveyor prior to said article of said second group of articles engaging said pop-up conveyor as a function of the length of the item or the length of a first portion of said selected article falls within a selected proximity to said pop-up conveyor for imparting a transverse force diverting said article of said second group of articles.

10. A method of off-loading, typing, and sorting articles from a bulk package conveyor flow with a vision management system and pop-up slide sorter, comprising the steps of:

identifying and sorting selected packages from an off-loading feed conveyor using a slide sorter pop-up conveyor includes the steps of conveying a selected group of articles of a selected size, shape, irregular base, ID marking, or other characteristic along a longitudinal axis of a first upstream off-loading feed conveyor, by a at least one photo eye device and/or at least one multiplex light screen sensor device identifying and sorting articles to be passed through to a downstream conveyor or diverted from said downstream conveyor;

positioning a pop-up or slide sorter conveyor between and in flow communication with the first upstream conveyor for passing selected articles over a plurality of rollers and through the pop-up conveyor to a second downstream conveyor;

diverting said selected articles with pop-up conveyor in a direction away from said second downstream conveyor by a plurality of driven belts of a pop-up conveyor which are raised above the surface of the rollers to contact the surface of the conveyed article;

selecting a transition zone between a feed conveyor and a receiving conveyor each one having independent drive means;

selecting a camera field of view of said selected transition zone;

setting a speed or movement of said feed conveyor, said receiving conveyor, or both said feed conveyor and said receiving conveyor to achieve a desired conveyor area utilization on a down stream receiving conveyor based on said at least one camera field view of said transition zone, a down stream receiving conveyor occupancy defined zone, a feeding conveyor occupancy defined zone and a desired occupancy after the merger;

determining a percentage of said feed conveyor occupancy defined zone;

determining a percentage of said receiving conveyor occupancy defined zone;

selecting a percentage of a desired occupancy of said receiving conveyor after a merger of said packages from said feeding conveyor to said receiving conveyor;

selecting a conveyor area including a desired occupancy zone at a selected position;

feeding said packages from said feed conveyor to said receiving conveyor occupancy defined zone at a selected rate;

conveying said packages toward said desired occupancy zone of said conveyor area at a selected position; and merging said packages at said conveyor area of said transition section between said feed conveyor and said receiving conveyor.

* * * * *